(12) United States Patent
Ohno et al.

(10) Patent No.: US 7,879,431 B2
(45) Date of Patent: *Feb. 1, 2011

(54) HONEYCOMB STRUCTURE

(75) Inventors: Kazushige Ohno, Gifu (JP); Masafumi Kunieda, Gifu (JP); Kazutake Ogyu, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 441 days.

This patent is subject to a terminal disclaimer.

(21) Appl. No.: 11/473,151

(22) Filed: Jun. 23, 2006

(65) Prior Publication Data

US 2006/0292341 A1 Dec. 28, 2006

(30) Foreign Application Priority Data

Jun. 27, 2005 (WO) ................. PCT/JP2005/012265

(51) Int. Cl.
*B32B 3/12* (2006.01)

(52) U.S. Cl. ...................................... 428/116

(58) Field of Classification Search ................. 428/116, 428/117

See application file for complete search history.

(56) References Cited

U.S. PATENT DOCUMENTS

| | | | | |
|---|---|---|---|---|
| 4,883,507 A | * | 11/1989 | Rey et al. ...................... 95/273 |
| 2002/0197193 A1 | * | 12/2002 | Harada et al. ................ 422/177 |
| 2003/0170160 A1 | * | 9/2003 | Morita et al. ................ 423/247 |
| 2005/0227869 A1 | | 10/2005 | Ohno et al. |
| 2005/0247038 A1 | * | 11/2005 | Takahashi .................... 55/523 |
| 2005/0266992 A1 | | 12/2005 | Ohno et al. |
| 2008/0118701 A1 | | 5/2008 | Ohno et al. |
| 2008/0119355 A1 | | 5/2008 | Ohno et al. |
| 2008/0176028 A1 | | 7/2008 | Ohno et al. |
| 2008/0187713 A1 | | 8/2008 | Ohno et al. |
| 2008/0241003 A1 | | 10/2008 | Ido et al. |
| 2008/0241005 A1 | | 10/2008 | Ido et al. |
| 2008/0241008 A1 | | 10/2008 | Ido et al. |
| 2008/0260991 A1 | | 10/2008 | Konstandopoulos et al. |

(Continued)

FOREIGN PATENT DOCUMENTS

DE 43 41 159 A 1 6/1995

(Continued)

OTHER PUBLICATIONS

European Search Report.

(Continued)

*Primary Examiner*—Gordon R Baldwin
(74) *Attorney, Agent, or Firm*—Finnegan, Henderson, Farabow, Garrett & Dunner LLP

(57) ABSTRACT

A honeycomb structure 10 includes: multiple honeycomb units 11 having multiple through holes 12; and a seal layer 14 that joins honeycomb units 11 with each other via respective closed outer faces 13 of the honeycomb units 11 where the through holes are not open. The honeycomb unit 11 includes at least inorganic particles, inorganic fibers and/or whiskers. A cross section area of a honeycombed face of the honeycomb unit perpendicular to the through holes 12 is about 5 to about 50 cm². The flatness of an entire end face as the honeycombed faces of the honeycomb units 11 joined by the seal layer 14 is about 2.5 mm or less. The level difference between the end faces of the honeycomb units 11 is about 2.0 mm or less.

13 Claims, 13 Drawing Sheets

U.S. PATENT DOCUMENTS

2009/0095416 A1    4/2009  Kunseda et al.

FOREIGN PATENT DOCUMENTS

| | | | |
|---|---|---|---|
| EP | 0 857 511 A2 | | 8/1998 |
| JP | 04-042184 | * | 8/1993 |
| JP | 5-213681 | | 8/1993 |
| JP | 10-263416 | | 10/1998 |
| JP | 11088391 | * | 10/2000 |
| JP | 2000-005063 | * | 7/2001 |
| JP | 2001-190916 | | 7/2001 |
| JP | 2002-224516 | | 8/2002 |
| JP | 2003-024726 | | 1/2003 |
| JP | 2003-025316 | | 1/2003 |
| WO | WO 2005/063653 A1 | | 7/2005 |
| WO | WO 2005/075075 A1 | | 8/2005 |

OTHER PUBLICATIONS

U.S. Appl. No. 11/474,287.
U.S. Appl. No. 11/475,967.
U.S. Appl. No. 11/541,688.
U.S. Appl. No. 11/925,394.
U.S. Appl. No. 11/853,658.
U.S. Appl. No. 11/928,546.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.

* cited by examiner (a)

(b)

HONEYCOMB STRUCTURE 10

(a) Example 1

(b) Example 2

(c) Example 3

(d) Example 4

(a) Example 5

(b) Example 6

(c) Example 7

(a)

(b)

HONEYCOMB STRUCTURE

BACKGROUND ART

1. Field of the Invention

The invention relates to a honeycomb structure.

2. Description of the Related Art

A honeycomb catalyst is generally used to convert the exhaust gas of vehicles. The honeycomb catalyst is conventionally manufactured by making a material of a high specific surface area, for example, active alumina, and a catalyst metal, for example, platinum, carried on the surface of an integral cordierite base honeycomb structure of low thermal expansion characteristics. An alkaline earth metal, such as Ba, is carried on the honeycomb structure as a NOx storage agent to treat NOx in an excess oxygen atmosphere of, for example, lean burn engines and diesel engines. The enhanced conversion performance is attained by improving the potential for bringing the exhaust gas into contact with the noble metal catalyst and the NOx storage agent. For this purpose, it is required to increase the specific surface area of the carrier while decreasing the particle size of the noble metal and making the particles of the noble metal highly dispersed. A simple increase in the carried amount of the material having a high specific surface area, for example, active alumina, may, however, only increase the thickness of an alumina layer, while not significantly increasing the contact potential and undesirably heightening a pressure loss. One proposed technique accordingly specifies the shape of cells, the cell density, and the wall thickness to enhance the contact potential (see, for example, JP-A 10-263416). Another known honeycomb structure is manufactured by extrusion molding a material of a high specific surface area with inorganic fibers and an inorganic binder (see, for example, JP-A 5-213681). One joining a honeycomb unit through an adhesive layer so as to enlarge such a honeycomb structure has been known (for example, see DE-A 4341159). The contents of JP-A 10-263416, JP-A 5-213681, and DE 4341159 A are incorporated by reference herein.

SUMMARY OF THE INVENTION

A honeycomb structure of the present invention includes: multiple honeycomb units having multiple through holes; and a seal layer that joins honeycomb units with each other via respective closed outer faces of the honeycomb units where the through holes are not open. In this honeycomb structure, the honeycomb unit includes at least inorganic particles, inorganic fibers and/or whiskers, a cross section area of a honeycombed face of the honeycomb unit perpendicular to the through holes is about 5 to about 50 $cm^2$, the flatness of an entire end face of the honeycomb units joined by the seal layer where the through holes are open is about 2.5 mm or less, and the level difference between end faces of the honeycomb units joined by the seal layer is about 2.0 mm or less.

In the honeycomb structure of the invention, a ratio of the total sum of the cross section areas of the honeycombed faces of the honeycomb units perpendicular to the through holes to a cross section area of a honeycombed face of the honeycomb structure perpendicular to the through holes is preferably 85% or more, and more preferably about 90% or more.

In the honeycomb structure of the invention, the flatness of the entire end face of the honeycomb units joined by the seal layer is preferably about 2.0 mm or less. And the level difference between end faces of the honeycomb units joined by the seal layer is preferably about 1.0 mm or less.

The honeycomb structure of the invention preferably has the specific surface area of about 35000 to about 70000 $cm^2/L$.

In the honeycomb structure of the invention, wherein the inorganic particles may include at least one type selected from the group consisting of alumina, silica, zirconia, titania, ceria, mullite, and zeolite.

In the honeycomb structure of the invention, the inorganic fibers and whiskers may include at least one type selected from the group consisting of alumina, silica, silicon carbide, silica alumina, glass, potassium titanate, and aluminum borate.

In the honeycomb structure of the invention, the honeycomb unit may further include an inorganic binder, and the inorganic binder includes at least one type selected from the group consisting of alumina sol, silica sol, titania sol, water glass, sepiolite, and attapulgite. A catalyst component may be carried on the honeycomb structure of the invention. The catalyst component may include at least one type selected among noble metals, alkali metals, alkaline earth metal, and oxides.

The honeycomb structure of the invention may be used for a catalytic converter for converting the exhaust gas of vehicles.

BRIEF DESCRIPTION OF THE DRAWINGS

FIG. 1(a) is a perspective view of a honeycomb unit 11, and FIG. 1(b) is a perspective view of the honeycomb structure 10;

FIG. 6(a) is a front view thereof and FIG. 6(b) is a side view thereof;

FIG. 8(a) shows the setup of temporary reference points, FIG. 8(b) shows the setup of XY axes;

DESCRIPTION OF THE PREFERRED EMBODIMENTS

Figure 1:
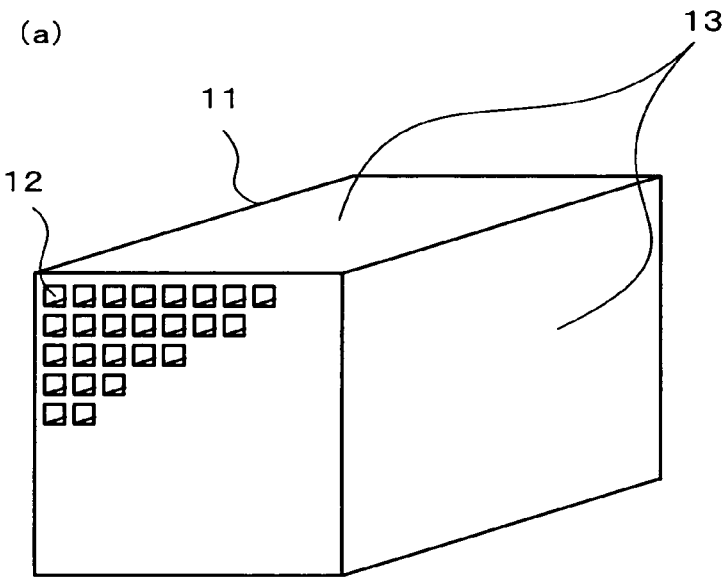
FIG. 1 schematically illustrates a honeycomb structure 10 of one embodiment of the invention.
Figure 1:
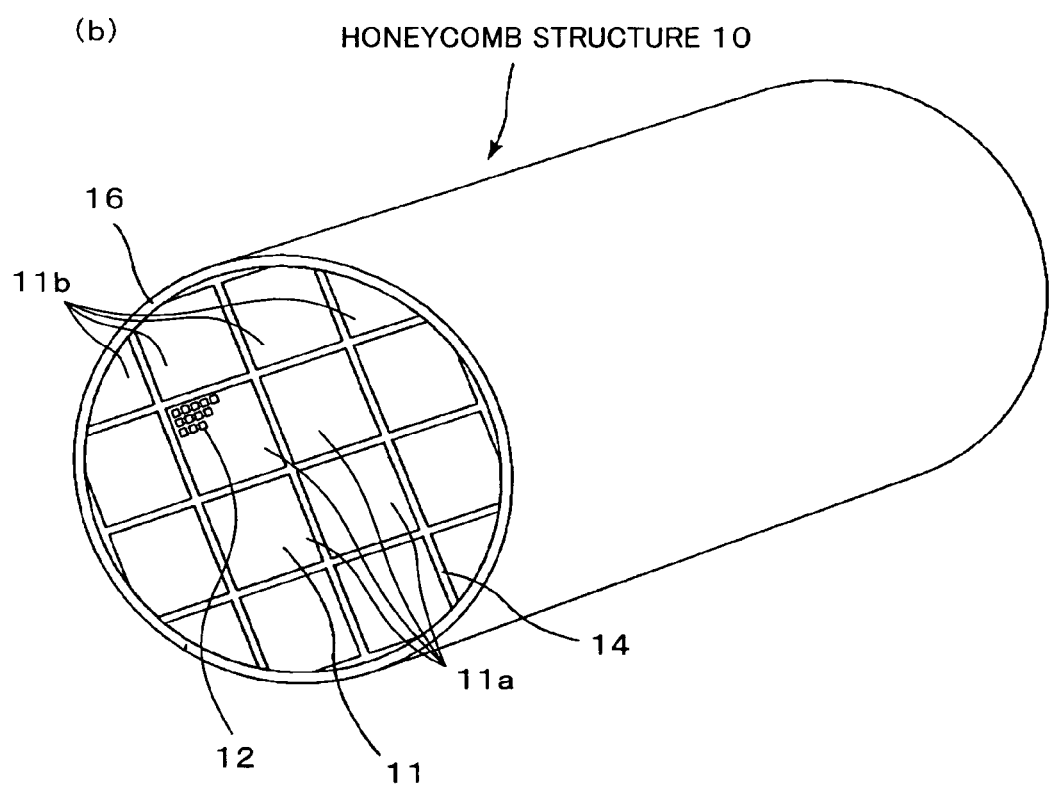

One embodiment of the invention regards a honeycomb structure including: multiple honeycomb units having multiple through holes; and a seal layer that joins honeycomb units with each other via respective closed outer faces of the honeycomb units where the through holes are not open. In this honeycomb structure, the honeycomb unit includes at least inorganic particles, inorganic fibers and/or whiskers; a cross section area of a honeycombed face of the honeycomb unit perpendicular to the through holes is about 5 to about 50 cm²; the flatness of an entire end face of the honeycomb units joined by the seal layer where through holes are open is about 2.5 mm or less; and the level difference of an end face between the honeycomb units joined by the seal layer is about 2.0 mm or less.

The flatness represents the difference between the highest point of the highest unit end face and lowest point of the lowest unit end face of the entire multiple unit end faces in the honeycombed face of the honeycomb unit. The level difference between the end faces of honeycomb units represents the difference between the highest point of one unit and lowest point of the other unit of two honeycomb units joined by the seal layer, i.e., the largest level difference on the two unit end faces. Since multiple honeycomb units are joined via the seal layer in the honeycomb structure, strength to thermal shocks and vibrations can be enhanced. It is presumed that even when an abrupt temperature change causes a significant temperature distribution in the honeycomb structure, each honeycomb unit has a relatively small temperature difference, or that the seal layers desirably relax the thermal shocks and vibrations. The seal layers are thought to prevent a crack caused by heat stress from being spread over the whole honeycomb structure, by working as frames of the honeycomb structure to keep the shape as a honeycomb structure while ensuring the function of the respective honeycomb units as catalyst carriers. When the cross-section area of the face where the through holes are opened is about 5 cm² or more referring to the size of the honeycomb unit, the cross section area of the seal layer for joining multiple honeycomb units is reduced, and thereby the specific surface area for the catalyst carriage is relatively increased, and the pressure loss is reduced. When the cross section area is about 50 cm² or less, the unit is not too large, and the heat stress generated in each honeycomb unit can be easily suppressed. Since the flatness of the honeycombed faces of the honeycomb units joined by the seal layer is about 2.5 mm or less and the level difference between the honeycomb units joined by the seal layer is about 2.0 mm or less, the damage of the honeycomb structure generated in the level difference between the honeycomb units joined by the seal layer can be easily suppressed. For example, the flatness of about 2.5 mm or less and the level difference of about 2.0 mm or less between the honeycomb units can suppress the generation of damage in the level difference part while the honeycomb structure is conveyed and the honeycomb structure is fixed to a casing and used. That is, the cross section area of the honeycombed face of the honeycomb unit in the range of about 5 to about 50 cm², the flatness of about 2.5 mm or less of the honeycombed faces of the honeycomb units perpendicular to the through holes of the honeycomb units, and the level difference of about 2.0 mm or less between the honeycomb units joined by the seal layer keep a large specific surface area, easily suppress pressure loss, have sufficient strength to heat stress, and easily obtain high durability to a practical level. Therefore, in accordance with the honeycomb structure, the catalyst components can be highly dispersed and strength to thermal shocks and vibrations can be enhanced. The cross section area represents the cross section area of the honeycomb unit as a basic unit constituting the honeycomb structure when the honeycomb structure includes multiple honeycomb units having different cross section areas, and usually represents the maximum cross section area of the honeycomb unit.

In the honeycomb structure of the embodiment, a ratio of the total sum of the cross section areas of the honeycombed faces of the honeycomb units perpendicular to the through holes to an cross section area of a honeycombed face of the honeycomb structure perpendicular to the through holes is preferably about 85% or more, and more preferably about 90% or more. Since the cross section area of the seal layer is reduced and the total cross section areas of the honeycomb units are increased when the ratio is about 85% or more, the specific surface area for catalyst carriage is relatively increased, and the pressure loss can be reduced. The pressure loss can be easily reduced when the ratio is about 90% or more.

The honeycomb structure of the embodiment may be provided with a coating layer covering the outer circumferential face without the through holes. The coating layer can protect the outer circumferential face to easily enhance the strength of the honeycomb structure.

In the honeycomb structure of the embodiment, the inorganic particles include at least one type selected from the group consisting of alumina, silica, zirconia, titania, ceria, mullite and zeolite particles. Especially preferable is alumina. The honeycomb unit having a large specific surface area can be comparatively easily produced.

In the honeycomb structure of the embodiment, the inorganic fibers and whiskers include at least one type selected from the group consisting of alumina, silica, silicon carbide, silica alumina, glass, potassium titanate and aluminum borate. Especially preferable is silica alumina fibers. The inorganic fibers and whiskers may have a function as a reinforcing agent of the honeycomb unit. The honeycomb unit having enhanced strength can be comparatively easily produced.

In the honeycomb structure of the embodiment, it is preferable that the honeycomb unit further includes an inorganic binder. The lower temperature for firing the honeycomb unit thus can easily provide sufficient strength. Examples of the inorganic binders included in the honeycomb structure include inorganic sol and a clay binder. Of these, examples of the inorganic sols include at least one type of inorganic sol selected from alumina sol, silica sol, titania sol and water glass or the like. Examples of the clay binders include at least one type of a clay binder selected from white clay, kaolin, montmorillonite and a double chain structural type clay (sepiolite, attapulgite).

A catalyst component is preferably carried on the honeycomb structure of the embodiment. The catalyst component may include at least one type selected among noble metals, alkali metals, alkaline earth metal and oxides. Examples of the noble metal include at least one type selected among platinum, palladium, and rhodium or the like. Examples of the alkali metal include at least one type selected among potassium and sodium or the like. The alkaline earth metal is, for example, barium. The alkali metal and alkaline earth metal may be included as the catalyst component, and may be in a state of a compound (salt or the like). Examples of the oxides include at least one type selected from one ($LaCoO_3$, $LaMnO_3$ or the like) having a perovskite structure and $CeO_2$ or the like. As the oxides having the perovskite structure, for example, the A site of the perovskite structure (general formula $ABO_3$) is at least one type of element selected from La, Y and Ce or the like. Of these, La is preferable, and examples thereof include one or multiple types of elements in which the B site of the general formula is selected from Fe, Co, Ni, Mn or the like. Some elements of the A site may be replaced by K, Sr and Ag or the like as in $La_{0.75}K_{0.25}CoO_3$ or the like.

The honeycomb structure of the embodiment is preferably used as a catalytic converter (for example, a three-way catalyst or a NOx storage catalyst) for conversion of the exhaust gas of vehicles.

The prior art honeycomb structures cited in the description of the related art have some drawbacks. The sintering of a material having a high specific surface area such as alumina is advanced by heat aging, and the specific surface area is reduced. A catalyst metal, such as platinum carried on is condensed according to the reduction of the specific surface area, the particle diameter is increased, and the specific surface area is reduced. That is, so as to have a higher specific surface area after heat aging (used as a catalyst carrier), it is necessary to increase the specific surface area in an early stage. As described above, the enhanced conversion performance is attained by improving the potential for bringing the exhaust gas into contact with the noble metal catalyst and the NOx storage agent. That is, it is important to increase the specific surface area of the carrier while decreasing the particle size of the catalyst metal and making the particles of the catalyst metal highly dispersed. However, the cordierite base honeycomb structure disclosed in JP-A 10-263416 has material having a high specific surface area, for example, active alumina, and the catalyst metal, for example, platinum, carried on the surface thereof. This prior art technique specifies the shape of cells, the cell density, and the wall thickness to increase the specific surface area of the catalyst carrier and thereby enhance the potential for bringing the exhaust gas into contact with the catalyst metal. This prior art technique, however, does not sufficiently increase the specific surface area of the catalyst carrier. The insufficient specific surface area of the catalyst carrier results in insufficient dispersion of the catalyst metal and poor conversion performance of the exhaust gas after heat aging. A significant increase in the amount of the catalyst metal and size growth of the catalyst carrier may compensate for such insufficiency. Platinum and other noble metals are, however, very expensive and moreover limited precious resources. The size increase of the catalyst carrier is not desirable when the honeycomb structure with the catalyst is mounted on a limited space, such as an automobile.

The honeycomb structure disclosed in JP-A 5-213681 is obtained by extrusion molding a material having a high specific surface area with the inorganic fibers and the inorganic binder. Since a substrate itself is made of a material having a high specific surface area, the honeycomb structure gives a carrier of a high specific surface area and attains sufficiently high dispersion of a catalyst metal. However, the alumina or the like for a substrate could not be fully sintered so as to maintain the specific surface area, and the strength of the substrate was very weak. As described above, when the honeycomb structure is used for vehicles, a space for setting is significantly restricted. Therefore, so as to raise the specific surface area of the carrier per unit volume, a means for thinning a partition wall was used. However, the strength of the substrate became weaker still. Since the alumina or the like has a large coefficient of thermal expansion, a crack is easily generated by heat stress at the time of firing (calcination) and using. Since an external force such as heat stress due to a rapid temperature change and larger vibration at the time of use was added when the honeycomb structure is used for vehicles, the honeycomb structure was easily damaged, and the shape of the honeycomb structure could not be kept. In addition, the function as the catalyst carrier could not be attained.

Since the honeycomb structure is enlarged in the catalyst carrier for vehicles in DE-A 4341159, a honeycomb structure having a cross section area of the honeycomb unit of 200 cm$^2$ or more is shown. However, when the honeycomb structure was used in a situation where heat stress due to a rapid temperature change and larger vibration or the like were added, as described above, the honeycomb structure was easily damaged, and the shape could not be kept. In addition, the function as the catalyst carrier could not be attained.

The invention has been accomplished in view of the foregoing and other problems. The honeycomb structure of the invention ensures high disperse of catalyst components and the strength to thermal shocks and vibration.

Next, some modes for carrying out the invention will be described below using the drawings.

The honeycomb structure of the embodiment will be described. FIG. 1 schematically illustrates a honeycomb structure 10 of the embodiment. FIG. 1(a) is a perspective view of a honeycomb unit 11, and FIG. 1(b) is a perspective view of the honeycomb structure 10. The honeycomb structure 10 is constituted as the honeycomb structure having a function for converting toxic substances in the exhaust gas of an engine (for example, hydrocarbon HC, carbon monoxide CO and nitrogen oxide NOx or the like) for catalyst converter. The honeycomb structure 10 is provided with multiple honeycomb units 11 having multiple through holes 12 arranged in parallel along the longitudinal direction, a seal layer 14 for joining the honeycomb units 11 via the outer faces 13 on which the through holes 12 are not opened, and a coating layer 16 for covering the outer circumferential face on which the through holes 12 are not opened among the multiple honeycomb units 11 joined by the seal layer 14. The honeycomb unit 11 contains a basic unit 11a having a rectangular pillar shape and a modification unit 11b cut so that the corner of the rectangular pillar shape is curved. Of these, the basic units 11a are arranged by two in length and two in width at the center of the honeycomb structure 10, and the outer faces 13 of the adjacent basic units 11a are joined by the seal layer 14 with each other. The modification units 11b are arranged around the basic units 11a arranged by two in length and two in width, and the outer faces 13 of the adjacent modification units 11b or the outer faces 13 of the adjacent modification units 11b and basic units 11a are joined by the seal layer 14. Thus, the basic units 11a and the modification units 11b are joined, and the outer shape of the honeycomb structure 10 is cylindrically formed. The numbers of the basic unit 11a and modification units 11b constituting the honeycomb structure 10 may be an arbitrary number based on the size of the honeycomb structure 10 or the honeycomb unit 11. The outer shape of the honeycomb structure 10 may have an arbitrary shape and size. For example, the outer shape may have a rectangular pillar or a cylindroid shape.

A specific surface area per unit volume of the honeycomb structure 10 is preferably about 28000 m$^2$/L or more, more preferably about 35000 m$^2$/L or more, and most preferably about 38000 m$^2$/L. The specific surface area per unit volume is preferably about 70000 m$^2$/L or less by taking into account the limit of dispersion of the catalyst. The specific surface area per unit volume is obtained by calculating the specific surface area per unit volume of the honeycomb unit from the specific surface area per unit weight by BET specific surface area measurement of the honeycomb unit 11, and by multiplying the ratio of the volume of the honeycomb unit 11 to the whole honeycomb structure 10. That is, since the seal layer 26 hardly contributes to conversion of the exhaust gas, the volume of the seal layer 26 is excepted, and the specific surface area per volume of the honeycomb structure 20 is calculated. The specific surface area per unit volume is calculated by Equation (1) given below.

Figure 2:
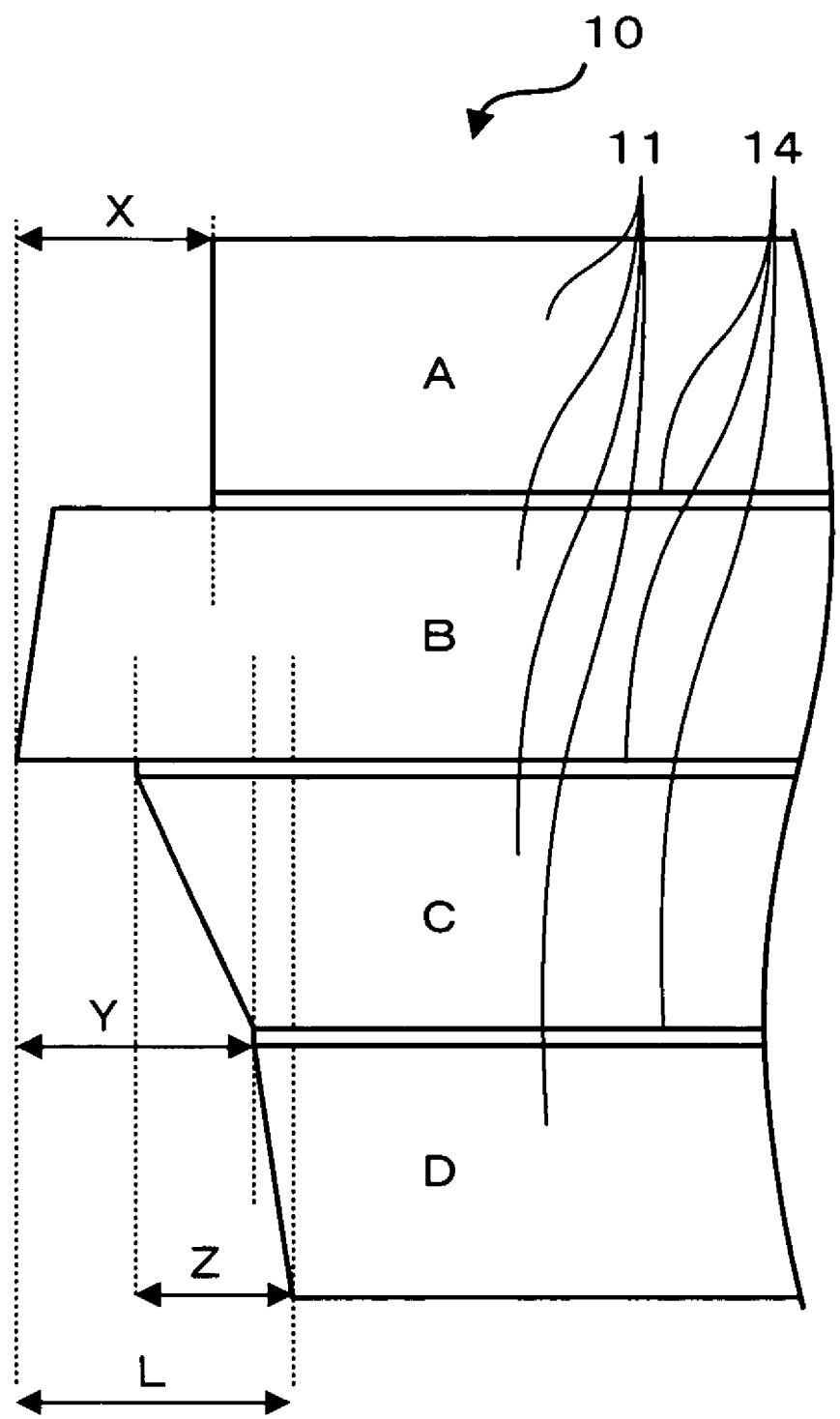
FIG. 2 schematically illustrates the flatness and the unit level difference when viewing the honeycomb structure 10 from the side face.

In the honeycomb structure 10, the flatness of the honeycombed faces of the honeycomb units 11 joined by the seal layer 14 (hereinafter merely referred to as flatness) is about 2.5 mm or less, and the level difference (hereinafter referred to as unit level difference) between the honeycomb units 11 joined by the seal layer 14 is about 2.0 mm or less. The flatness of about 2.5 mm or less and the level difference of about 2.0 mm or less between the honeycomb units can easily suppress the generation of damage in the level difference part while, for example, the honeycomb structure is conveyed and the honeycomb structure is fixed to the casing and used. FIG. 2 schematically illustrates the flatness and the unit level difference when viewing the honeycomb structure 10 from the side face. The honeycomb structure 10 in FIG. 2 is exaggeratingly expressed to facilitate explanation. Herein, the flatness represents the difference between the highest point and lowest point of the end face in which the through holes 12 of the honeycomb structure 10 are opened. For example, in FIG. 2, the difference L between the highest point of the honeycomb unit B and the lowest point of the honeycomb unit D is the flatness. The level difference (unit level difference) between the honeycomb units represents the difference between the highest point of one unit and the lowest point of the other unit of two honeycomb units joined by the seal layer, i.e., the largest level difference between the two unit end faces. For example, in FIG. 2, the unit level difference between the honeycomb unit A and the honeycomb unit B is X, and the unit level difference between the honeycomb unit B and the honeycomb unit C is Y. The unit level difference between the honeycomb unit C and the honeycomb unit D is Z. The flatness is more preferably about 2.0 mm or less, and most preferably about 1.0 mm or less. The unit level difference is more preferably about 1.0 mm or less, and most preferably about 0.5 mm or less.

The cross section area of the face, on which the through holes 12 are opened, of the honeycomb unit 11 constituting the honeycomb structure 10 is about 5 to about 50 cm². Since the cross section area of about 5 cm² or more reduces the cross section area of the seal layer 14 for joining multiple honeycomb units 11, the specific surface area for catalyst carriage is relatively increased, and the pressure loss is easily reduced. When the cross section area is about 50 cm² or less, the size of the unit is not too large, and the heat stress generated in the respective honeycomb unit can be easily suppressed. The cross section area in the range of about 5 to about 50 cm² can adjust the ratio of the seal layer to the honeycomb structure. Thereby, the large specific surface area per unit volume of the honeycomb structure can be kept, and the catalyst component can be highly dispersed. Also, even if an external force such as thermal shocks and vibrations is added, the shape of a honeycomb structure can be easily maintained. The cross section area is preferably about 5 cm² or more in view of the reduced pressure loss.

It is preferable that the shape of the honeycomb unit 11 can easily join the honeycomb units 11 with each other, and the section of the face on which the through holes 12 are opened may be a square, a rectangle, a hexagon or a fan. The honeycomb structure 11 has a large number of through holes 12 toward the interior from the front side in FIG. 1(*a*) and the outer faces 13 having no through holes 12. The wall thickness of the wall between adjoining through holes 12 is in a range of about 0.05 to about 0.35 mm, more preferably about 0.10 to about 0.30 mm, and most preferably about 0.15 to about 0.25 mm. Since the wall thickness of about 0.05 mm or more easily increases the strength of the honeycomb unit 11, and the wall thickness of about 0.35 mm or less easily increases the contact surface with exhaust gas, the catalyst function is improved. The number of through holes per unit cross section area is preferably in a range of about 15.5 to about 186/cm² (about 100 to about 1200 cpsi), more preferably in a range of about 46.5 to about 170.5/cm² (about 300 to about 1100 cpsi), and most preferably in a range of about 62.0 to about 155/cm² (about 400 to about 1000 cpsi). The number of through holes of about 15.5/cm² or more easily increases the area of the walls inside the honeycomb unit 11 that are in contact with the exhaust gas, and the number of through holes of about 186/cm² or less easily reduces pressure loss and facilitates preparation of the honeycomb unit. The shape of the through holes formed in the honeycomb unit may have a section of an approximate triangle or an approximate hexagon.

The honeycomb unit 11 includes alumina as the inorganic particles, silica alumina fibers as the inorganic fibers, and silica of the origin of silica sol as the inorganic binder. The inorganic particles included in the honeycomb unit 11 may be, for example, silica, zirconia, titania, ceria, mullite and zeolite particles. The amount of inorganic particles included in the honeycomb structure 10 is preferably in a range of about 30 to about 97% by weight, more preferably in a range of about 30 to about 90% by weight, still more preferably in a range of about 40 to about 80% by weight, and most preferably in a range of about 50 to about 75% by weight. The content of the inorganic particles of about 30% by weight or more can relatively increase the amount of inorganic particles contributing to improvement in specific surface area, and results in a high specific surface area of the honeycomb structure and the catalyst component carried on the honeycomb structure can be easily highly dispersed. The content of the inorganic particles of about 90% by weight or less easily increases the amount of inorganic fibers contributing to the improvement in strength, and increases the strength of the honeycomb structure.

The inorganic fibers included in the honeycomb unit 11 may be, for example, silica, silicon carbide, glass, potassium titanate and aluminum borate, and whiskers thereof or the like in addition to alumina. The amount of inorganic fibers included in the honeycomb structure 10 is preferably in a range of about 3 to about 70% by weight, more preferably in a range of about 3 to about 50% by weight, still more preferably in a range of about 5 to about 40% by weight, and most preferably in a range of about 8 to about 30% by weight. The content of inorganic fibers of about 3% by weight or more easily increases the strength of the honeycomb structure, and the content of inorganic fibers of about 50% by weight or less easily increases the amount of inorganic particles or the like contributing to the improvement in specific surface area, thereby resulting in a high specific surface area of the honeycomb structure and a high dispersion of the catalyst component carried on the honeycomb structure. The aspect ratio of the inorganic fibers and whiskers is preferably in a range of about 2 to about 1000, more preferably in a range of about 5 to about 800, and most preferably in a range of about 10 to about 500. The aspect ratio of the inorganic fibers and whiskers of about 2 or more can heighten the strength of the honeycomb structure 10, and the aspect ratio of about 1000 or less prevents clogging of a mold and improves the moldability. When the aspect ratio of the inorganic fibers and whiskers has a distribution, the average value may be set.

Examples of the inorganic binders included in the honeycomb unit 11 at the time of manufacture include inorganic sol and a clay binder. Of these, the inorganic sol may include, for example, alumina sol, silica sol, titania sol and water glass or the like. The clay binder may include, for example, white clay, kaolin, montmorillonite and a double chain structural type clay (sepiolite, attapulgite) or the like. The alumina sol, the silica sol, the water glass and the titania sol become alumina, silica and titania or the like by subsequent processing respectively. The amount of inorganic binder included in the honeycomb structure 10 as the solid content is preferably about 50% by weight or less, more preferably in a range of about 5 to about 50% by weight, still more preferably in a range of about 10 to about 40% by weight, and most preferably in a range of about 15 to about 35% by weight. The content of inorganic binder of about 50% or less improves the moldability. The honeycomb structure 10 may not include the inorganic binder.

The following describes an example of a manufacturing method of the honeycomb structure 10. The method first produces a honeycomb unit molded object by extrusion molding a material paste, which is mainly composed of inorganic particles, inorganic fibers and/or whiskers, and inorganic binder. The material paste may further include an organic binder, a dispersion medium, and a molding aid according to the moldability. The organic binder includes, for example, at least one type selected among methylcellulose, carboxymethylcellulose, hydroxyethylcellulose, polyethyleneglycol, phenol resin, and epoxy resin. The content of the organic binder is preferably in a range of about 1 to about 10% by weight relative to the total 100 parts by weight of the inorganic particles, the inorganic fibers and/or the whiskers, and the inorganic binder. The dispersion medium is, for example, water, an organic solvent, such as benzene, or an alcohol, such as methanol. The molding aid includes, for example, ethyleneglycol, dextrin, fatty acid, fatty acid soap, or polyalcohol.

The method preferably mixes, blends, or kneads the material paste with, for example, a mixer, an attritor, or a kneader. The material paste may be molded into the shape having through holes by any suitable method, for example, by extrusion molding. At this time, the material paste may be molded so that the cross section area of the face on which the through holes 12 are opened become about 5 to about 50 cm$^2$. Although the molding shape can be an arbitrary shape, the shape is preferably a rectangular pillar or the like.

The method preferably dries the molded body. A dryer used for this drying step is, for example, a microwave dryer, a hot air dryer, a dielectric dryer, a reduced pressure dryer, a vacuum dryer, or a freeze dryer. The method preferably degreases the molded body. The degreasing conditions are appropriately selected according to the types and amounts of organic substances included in the molded body, for example, about 400° C. for about 2 hours. The method preferably fires the molded body. The firing conditions are not specifically limited, but the preferable firing temperature is in a range of about 600 to about 1200° C., more preferably about 600 to about 1000° C. The firing temperature of about 600° C. or more easily advances the sintering of the inorganic particles or the like which heightens the strength of the honeycomb structure 10. The firing temperature of about 1200° C. or less easily prevents excessive sintering of the inorganic particles which suppresses a decrease in the specific surface area per unit volume to result in that high dispersion of the carried catalyst component is attained. The method accordingly makes possible the honeycomb unit 11 having multiple through holes.

Multiple honeycomb units 11 may successively be joined with one another by means of seal layers 14 made of a sealing paste, be dried, and be solidified to produce a honeycomb unit assembly of a predetermined size. It is preferable to select the honeycomb units 11 having nearly the same length and join the honeycomb units when joining the honeycomb units 11. The flatness of both ends of the honeycomb structure 10 is easily set to about 2.5 mm or less. The one faces of the honeycomb units 11 may be aligned and joined by the sealing paste so that the level difference between the honeycomb units 11 is not generated when joining the honeycomb units 11. For example, the provision of the end face having the flatness of about 2.5 mm or less and the unit level difference of about 2.0 mm or less at the upstream side of the exhaust gas can easily suppress damage of the in-use honeycomb structure 10. The sealing paste may be a mixture of inorganic binder and inorganic particles, a mixture of inorganic binder and inorganic fiber, or a mixture of inorganic binder, inorganic particle, and inorganic fiber. The sealing paste used may further include an organic binder. The organic binder used may be one or more types selected among polyvinyl alcohol, methylcellulose, ethylcellulose, and carboxymethylcellulose.

The thickness of the seal layer 14 for joining adjacent honeycomb units 11 with each other is preferably in a range of about 0.5 to about 2 mm. The thickness of the seal layer of about 0.5 mm or more easily gives a sufficient bonding strength. While the seal layer 14 does not function as the catalyst carrier, the thickness of about 2 mm or less easily suppresses a decrease in the specific surface area per unit volume of the honeycomb structure 10 and high dispersion of the catalyst component carried on the honeycomb structure is easily attained. The thickness of the seal layer 14 of about 2 mm or less easily reduces the pressure loss. The number of honeycomb units 11 joined together may be adequately determined for the desirable size of the honeycomb structure 10 used as the honeycomb catalyst. The honeycomb units 11 joined together by means of the seal layers may be cut or polished adequately according to the desired size of the honeycomb structure 10. Herein, the flatness is set to about 2.5 mm or less, and the unit level difference is set to about 2.0 mm or less when joining the honeycomb units 11. However, the flatness may be set to about 2.5 mm or less, and the unit level difference may be set to about 2.0 mm or less by cutting at least one end face using a cutter such as a diamond cutter and by polishing using a polishing device or the like after joining the honeycomb units 11.

The method may apply, dry, and solidify a coating agent onto the outer circumferential face (side face) of the honeycomb structure 10 without the through holes 12 to form a coating layer 16. The coating layer can protect the outer circumferential face to enhance the strength of the honeycomb structure. The coating paste used may be, for example, identical to or different from the sealing paste. The coating paste may have an identical mixing ratio to or a different mixing ratio from that of the sealing paste. The thickness of the coating layer 16 is preferably in a range of about 0.1 to about 2 mm. The thickness of the coating layer of about 0.1 mm or more can easily protect the outer circumferential face to enhance the strength of the honeycomb structure. The thickness of about 2 mm or less can prevent the specific surface area per unit volume of the honeycomb structure 10 from reducing, and a high dispersion of the catalyst component carried on the honeycomb structure is easily attained.

It is preferable that the multiple honeycomb units 11 joined together by means of the seal layers is calcined (after formation of the coating layer 16 if any). This calcination step degreases and removes the organic binders that may be included in the sealing paste and the coating paste. The calcination conditions are appropriately determined according to the types and amounts of the included organic substances, for example, about 700° C. for about 2 hours. In this way, the honeycomb structure 10 shown in FIG. 1(b) can be obtained. The method of manufacturing the honeycomb structure 10 joins a plurality of the honeycomb units 11 together by means of seal layers 14, cuts and polishes the joined assembly to a cylindrical shape, and coats the outer circumferential face of the cylindrical assembly without the through holes 12 to form a coating layer 16. The cutting and polishing step may be omitted from the manufacturing process of a honeycomb structure in a predetermined shape (for example, the cylindrical honeycomb structure shown in FIG. 1(b)) by molding the shapes of the honeycomb units 11 having fan-shaped cross sections and square cross sections and joining the honeycomb units 11 of the predetermined shapes together.

Referring to the application of the honeycomb structure 10, the honeycomb structure is preferably used as a catalyst carrier of a catalytic converter for conversion of the exhaust gas of the vehicle. Carriage of a catalyst component on the honeycomb structure 10 gives a honeycomb catalyst. The catalyst component used may be, for example, noble metals, alkali metals, alkaline earth metals, and oxides. Examples of the noble metal include at least one type selected from platinum, palladium, and rhodium. Examples of the alkali metal include at least one type selected from potassium and sodium or the like. The alkaline earth metal used is, for example, barium. The oxide used may be perovskite (for example, $La_{0.75}K_{0.25}MnO_3$), $CeO_2$ or the like. The alkali metal and alkaline earth metal may be included as the catalyst component, and may be in a state of a compound (salt or the like). The honeycomb catalyst is preferably used, for example, as a catalytic converter (a three-way catalyst or a NOx storage catalyst) for conversion of the exhaust gas of a vehicle. Referring to the carriage of the catalyst component, for example, the catalyst component may be carried after preparing of the honeycomb structure, or may be carried on the inorganic particles of the material paste. The method of carriage of the catalyst component is, for example, impregnation.

In the application as a catalyst carrier for conversion of the exhaust gas of a diesel engine, the honeycomb structure of the invention may be combined with a diesel particulate filter (DPF), which has a honeycomb structure of, for example, silicon carbide and functions to filter out and combust particulate materials (PM) included in the exhaust gas. The honeycomb structure 10 may be located in the upstream of or in the downstream of the DPF. In the arrangement of the honeycomb structure 10 in the upstream, the heat generated by an exothermic reaction in the upstream honeycomb structure is transmitted to the downstream DPF to accelerate a temperature increase for regeneration of the DPF. In the arrangement of the honeycomb structure of the invention in the downstream, on the other hand, the upstream DPF filters out the PM included in the exhaust gas and prevents clogging of the through holes in the downstream honeycomb structure of the invention. The downstream honeycomb structure 10 treats the gas component generated by incomplete combustion of the PM in the upstream DPF. The honeycomb structure 10 can be used for applications described in the above background art, and can also be used for applications (for example, absorbent or the like for absorbing the gas component and the fluid component) used without carriage of the catalyst component without being limited thereto.

According to the honeycomb structure 10 of the embodiment described above in detail, the cross section area of about 5 to about 50 cm² of the honeycombed faces of the honeycomb units 11 perpendicular to the through holes 12, the flatness of about 2.5 mm or less of the entire end face of the honeycomb structure 10, and the unit level difference of about 2.0 mm or less can easily attain high disperse of the catalyst component, and the strength to thermal shocks and vibrations.

EXAMPLES

Next, examples of the invention will be described using examples. Although examples of honeycomb structures produced under various conditions are described below, the invention is not limited to these examples.

Example 1

The process of example 1 mixed 40% by weight of γ-alumina particles (average particle diameter: 2 μm) as the inorganic particles, 10% by weight of silica alumina fibers (average fiber diameter: 10 μM, average fiber length: 100 μm, aspect ratio: 10) as the inorganic fibers, and 50% by weight of silica sol (solid content: 30% by weight) as the inorganic binder to give a mixture. The process added 6 parts by weight of methylcellulose as an organic binder and small amounts of a plasticizer and a lubricant with stirring to 100 parts by weight of the mixture and sufficiently kneaded the whole mixed composition. The mixed composition was extrusion molded by an extruder to a raw molded body.

Figure 3:
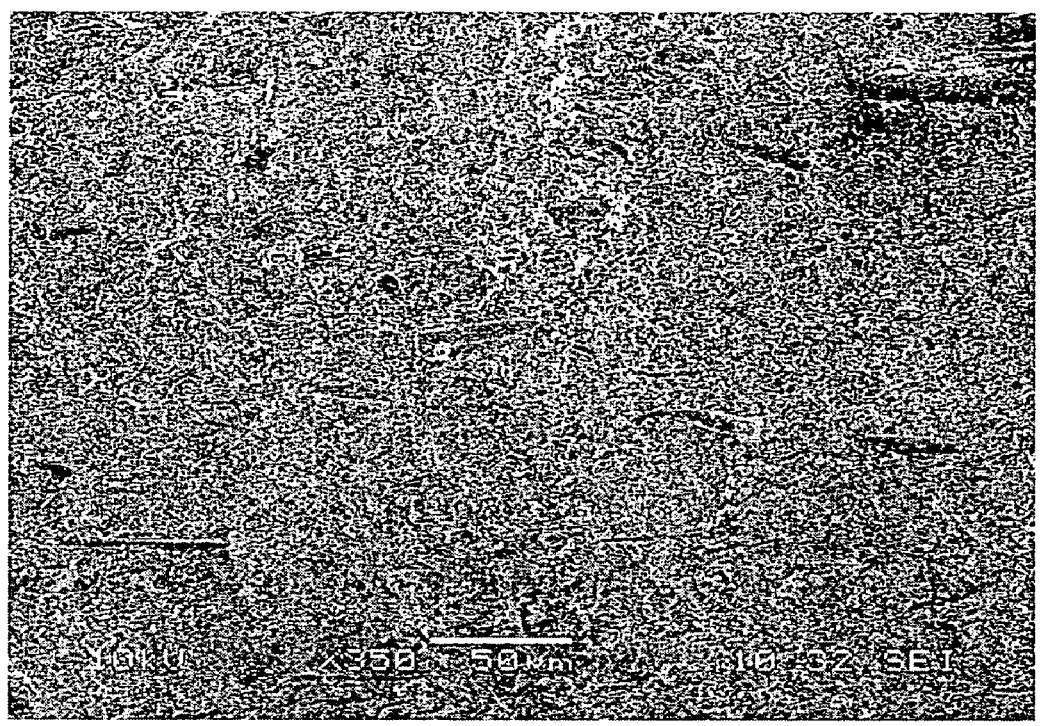
FIG. 3 is a SEM photograph of an outer face 13 of the honeycomb unit 11 of the invention.

The raw molded body was sufficiently dried with a microwave dryer and a hot air dryer and was kept at 400° C. for 2 hours for degreasing. The degreased molded body was fired at 800° C. for 2 hours to give a square-pillar honeycomb unit 11 (34.3 mm×34.3 mm×150 mm) having a cell density of 93 cells/cm² (600 cpsi), a wall thickness of 0.2 mm and a cell shape of tetragonum (square). FIG. 3 shows the electron microscope (SEM) photograph of the outer face 13 of the honeycomb unit 11. The SEM photograph shows that silica alumina fibers are oriented along the extruding direction of the material paste in the honeycomb unit 11.

Figure 4:
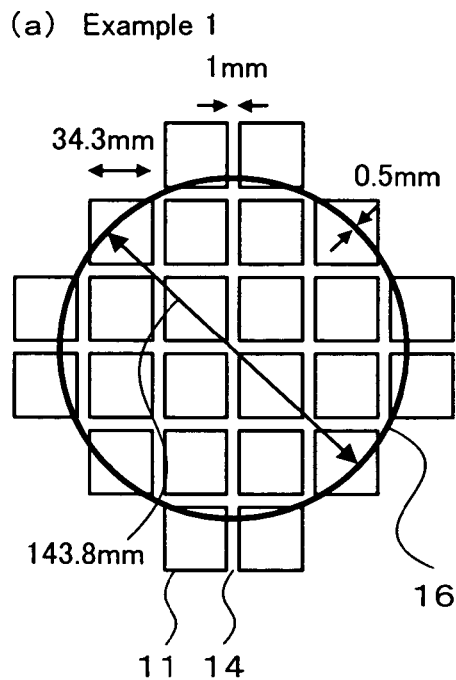
FIG. 4 schematically illustrates examples in which the multiple honeycomb units 11 are joined, FIGS. 4(a), (b), (c), (d) schematically illustrate an example 1, an example 2, an example 3 and an example 4 respectively.
Figure 4:
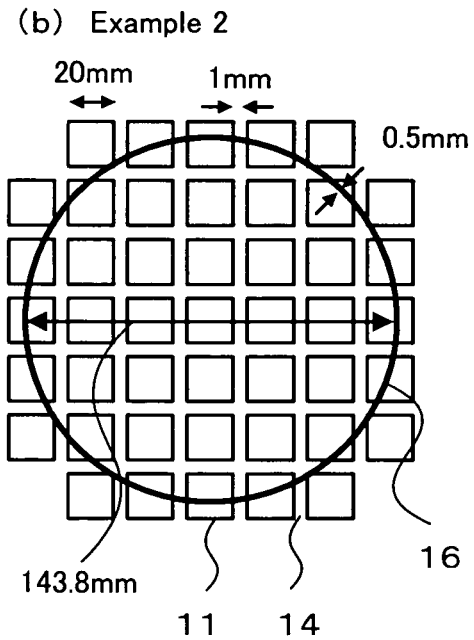
Figure 4:
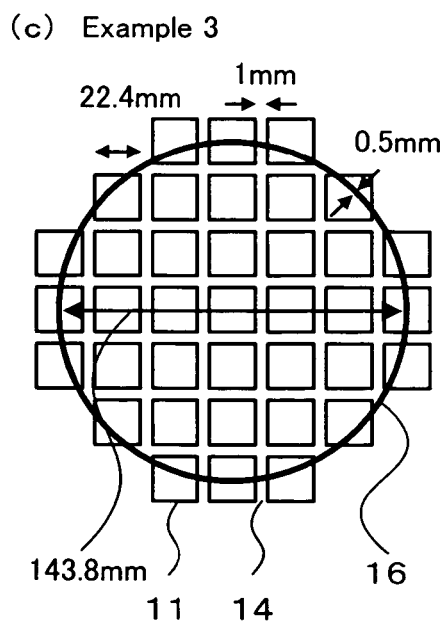
Figure 4:
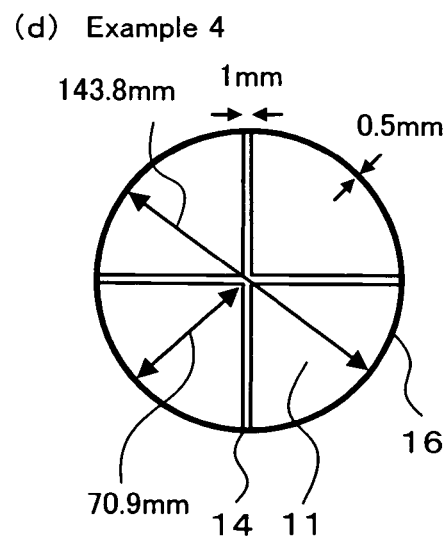

A heat-resisting sealing paste was prepared by mixing 29% by weight of γ-alumina particles (average particle diameter: 2 μm), 7% by weight of silica alumina fibers (average fiber diameter: 10 μm, average fiber length: 100 μm), 34% by weight of silica sol (solid content: 30% by weight), 5% by weight of carboxymethylcellulose, and 25% by weight of water. Multiple honeycomb units 11 were joined with one another by the sealing paste. FIG. 4(a) shows a honeycomb unit assembly, which is obtained by joining multiple honeycomb units 11 seen from a face (hereinafter referred to as front face) having through holes. The sealing paste was applied on the outer faces 13 of the honeycomb units 11 to form the seal layers 14 having a thickness of 1 mm, and the multiple honeycomb units 11 with the seal layers 14 were joined with one another and were fixed to form each honeycomb unit assembly. Each honeycomb unit assembly was cut with a diamond cutter into a cylindrical shape having a practically symmetric front face with respect to a point. The cylindrical outer surface of the cylindrical honeycomb unit assembly except the honeycombed face perpendicular to the through holes was coated with the above-described sealing paste in a thickness of 0.5 mm. The cylindrical honeycomb unit assembly was dried at 120° C. and was kept at 700° C. for 2 hours for degreasing of the seal layer and the coating layer. This gave the cylindrical honeycomb structure 10 (143.8 mmφ in diameter×150 mm in height). The inorganic particle component, unit shape, unit cross section area, unit area ratio (here and hereinafter represents a ratio of the total sum of the cross section areas of the honeycomb units to the cross section area of the honeycomb structure), and a ratio of the seal layer area (here and hereinafter represents a ratio of the total sum of the cross section areas of the seal layer and coating layer to the cross section area of the honeycomb structure) of the honeycomb structure 10 are shown in Table 1. Table 1 also shows the specifications of examples 2 to 29 described below. In all the samples shown in Table 1, the inorganic fibers are silica alumina fibers (average fiber diameter: 10 μm, average fiber length: 100 μm, aspect ratio: 10), and the inorganic binder is silica sol (solid content: 30% by weight).

TABLE 1

| Sample[1] | Inorganic particles | Unit shape cm | Unit cross section area cm² | Unit area ratio % | Seal layer area ratio[2] % |
|---|---|---|---|---|---|
| Example 1 | Alumina | 3.43 cm square | 11.8 | 93.5 | 6.5 |
| Example 2 | Alumina | 2.00 cm square | 4.0 | 89.7 | 10.3 |
| Example 3 | Alumina | 2.24 cm square | 5.0 | 90.2 | 9.8 |
| Example 4 | Alumina | 7.09 cm fan | 39.5 | 96.9 | 3.1 |
| Example 5 | Alumina | 7.10 cm square | 50.0 | 95.5 | 4.5 |
| Example 6 | Alumina | 7.41 cm square | 55.0 | 95.6 | 4.4 |
| Example 7 | Alumina | Integral | 162.0 | 100 | 0 |
| Example 8 | Titania | 3.43 cm square | 11.8 | 93.5 | 6.5 |
| Example 9 | Titania | 2.00 cm square | 4.0 | 89.7 | 10.3 |
| Example 10 | Titania | 2.24 cm square | 5.0 | 90.2 | 9.8 |
| Example 11 | Titania | 7.09 cm fan | 39.5 | 96.9 | 3.1 |
| Example 12 | Titania | 7.10 cm square | 50.0 | 95.5 | 4.5 |
| Example 13 | Titania | 7.41 cm square | 55.0 | 95.6 | 4.4 |
| Example 14 | Titania | Integral | 162.0 | 100 | 0 |

TABLE 1-continued

| Sample[1] | Inorganic particles | Unit shape cm | Unit cross section area cm² | Unit area ratio % | Seal layer area ratio[2] % |
|---|---|---|---|---|---|
| Example 15 | Silica | 3.43 cm square | 11.8 | 93.5 | 6.5 |
| Example 16 | Silica | 2.00 cm square | 4.0 | 89.7 | 10.3 |
| Example 17 | Silica | 2.24 cm square | 5.0 | 90.2 | 9.8 |
| Example 18 | Silica | 7.09 cm fan | 39.5 | 96.9 | 3.1 |
| Example 19 | Silica | 7.10 cm square | 50.0 | 95.5 | 4.5 |
| Example 20 | Silica | 7.41 cm square | 55.0 | 95.6 | 4.4 |
| Example 21 | Silica | Integral | 162.0 | 100 | 0 |
| Example 22 | Zirconia | 3.43 cm square | 11.8 | 93.5 | 6.5 |
| Example 23 | Zirconia | 2.00 cm square | 4.0 | 89.7 | 10.3 |
| Example 24 | Zirconia | 2.24 cm square | 5.0 | 90.2 | 9.8 |
| Example 25 | Zirconia | 7.09 cm fan | 39.5 | 96.9 | 3.1 |
| Example 26 | Zirconia | 7.10 cm square | 50.0 | 95.5 | 4.5 |
| Example 27 | Zirconia | 7.41 cm square | 55.0 | 95.6 | 4.4 |
| Example 28 | Zirconia | Integral | 162.0 | 100 | 0 |
| Example 29 | Cordierite + alumina | Integral | 162.0 | 100 | 0 |

[1]Inorganic fibers = silica alumina fibers (diameter: 10 μm, length: 100 μm, aspect ratio: 10)
[2]The area of a coating layer is included.

Examples 2 to 7

Figure 5:
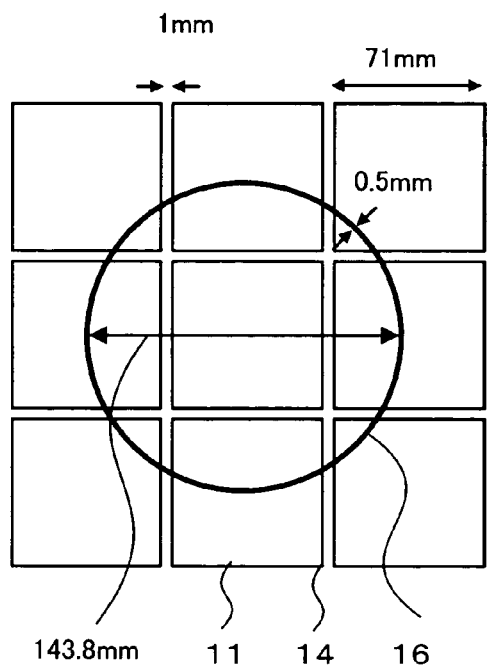
FIG. 5 schematically illustrates examples in which the multiple honeycomb units 11 are joined, FIGS. 5(a), (b), (c) schematically illustrate an example 5, an example 6 and an example 7 respectively.
Figure 5:
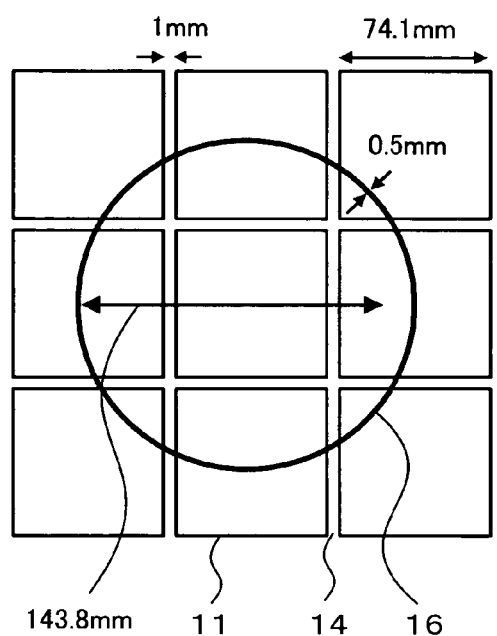
Figure 5:
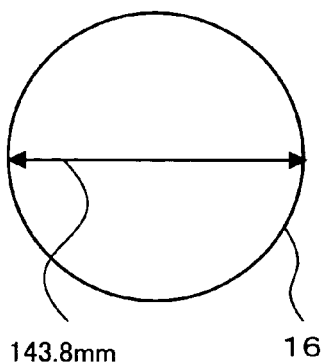

The honeycomb structures 10 were produced in the same manner as in the example 1 except for becoming the shapes shown in Table 1. The shapes of the honeycomb unit assemblies of the examples 2, 3 and 4 are respectively shown in FIGS. 4(*b*), (*c*) and (*d*), and the shapes of the honeycomb unit assemblies of the examples 5, 6 and 7 are respectively shown in FIGS. 5(*a*), (*b*) and (*c*). In the example 7, the honeycomb structure 10 is integrally molded, and a joining process and a cutting process were not performed.

Examples 8 to 14

The honeycomb units 11 were produced in the same manner as in the example 1 except for using titania particles (average particle diameter: 2 μm) as the inorganic particles and becoming the shapes shown in Table 1. Then, the honeycomb structures 10 were produced in the same manner as in the example 1 except for using the titania particles (average particle diameter: 2 μm) as the inorganic particles of the seal layer and coating layer. The shapes of the honeycomb unit assemblies of the examples 8 to 11 are respectively the same as those of FIGS. 4(*a*) to (*d*), and the shapes of the honeycomb unit assemblies of the examples 12 to 14 are respectively the same as those of FIG. 5(*a*) to (*c*). In the example 14, the honeycomb structure 10 is integrally molded.

Examples 15 to 21

The honeycomb units 11 were produced in the same manner as in the example 1 except for using the silica particles (average particle diameter: 2 μm) as the inorganic particles and becoming the shapes shown in Table 1. Then, the honeycomb structures 10 were produced in the same manner as in the example 1 except for using the silica particles (average particle diameter: 2 μm) as the inorganic particles of the seal layer and coating layer. The shapes of the honeycomb unit assemblies of the examples 15 to 18 are respectively the same as those of FIGS. 4(*a*) to (*d*), and the shapes of the honeycomb unit assemblies of the examples 19 to 21 are respectively the same as those of FIG. 5(*a*) to (*c*). In the example 21, the honeycomb structure 10 is integrally molded.

Examples 22 to 28

The honeycomb units 11 were produced in the same manner as in the example 1 except for using the zirconia particles (average particle diameter: 2 μm) as the inorganic particles and becoming the shapes shown in Table 1. Then, the honeycomb structures 10 were produced in the same manner as in the example 1 except for using the zirconia particles (average particle diameter: 2 μm) as the inorganic particles of the seal layer and coating layer. The shapes of the honeycomb unit assemblies of the examples 22 to 25 are respectively the same as those of FIGS. 4(*a*) to (*d*), and the shapes of the honeycomb unit assemblies of the examples 26 to 28 are respectively the same as those of FIGS. 5(*a*) to (*c*). In the example 28, the honeycomb structure 10 is integrally molded.

Example 29

A commercially available cylindrical cordierite honeycomb structure 10 (143.8 mmϕ in diameter×150 mm in height), which had alumina as a catalyst carrier layer inside the through holes, was used as an example 29. The honeycomb structure had hexagonal cells at a cell density of 62 cells/cm² (400 cpsi) and a wall thickness of 0.18 mm. The shape of the honeycomb structure seen from the front face is the same as that of FIG. 5(*c*).

Examples 30 to 34

The honeycomb units 11 were produced in the same manner as in the example 1 except for using the silica alumina fibers having the shapes shown in Table 2 as the inorganic fibers. Then, the honeycomb structures 10 were produced in the same manner as in the example 1 except for using the same silica alumina fibers as the honeycomb unit 11 as silica alumina fibers of the seal layer 14 and coating layer 16. The inorganic fibers (type, diameter, length, aspect ratio, particle diameter), unit shape and unit cross section area of the examples 30 to 34 are shown in Table 2. In all the samples shown in Table 2, the inorganic particles are γ-alumina particles, and the inorganic binder is silica sol (solid content: 30% by weight). Also, the unit area ratio is 93.5% and the seal layer area ratio is 6.5%. The shapes of the honeycomb unit assemblies of the examples 30 to 34 are the same as those of FIG. 4(*a*).

TABLE 2

| Sample[1] | Inorganic fibers | | | | Unit shape cm | Unit cross section area[2] cm² |
|---|---|---|---|---|---|---|
| | Type | Diameter μm | Length μm | Aspect ratio | | |
| Example 1 | Silica alumina fiber | 10 | 100 | 10 | 3.43 cm square | 11.8 |
| Example 30 | Silica alumina fiber | 5 | 50 | 10 | 3.43 cm square | 11.8 |
| Example 31 | Silica alumina fiber | 10 | 20 | 2 | 3.43 cm square | 11.8 |
| Example 32 | Silica alumina fiber | 10 | 5000 | 500 | 3.43 cm square | 11.8 |
| Example 33 | Silica alumina fiber | 10 | 10000 | 1000 | 3.43 cm square | 11.8 |
| Example 34 | Silica alumina fiber | 10 | 20000 | 2000 | 3.43 cm square | 11.8 |

[1]Inorganic particle = γ-alumina particles
[2]Unit area ratio = 93.5%
Area ratio of seal layer + Area ratio of coating layer = 6.5%

Examples 35 to 38

The honeycomb structures 10 were produced in the same manner as in the example 1 except for changing the cross section area of the honeycomb unit 11 and the thickness of the seal layer with which the honeycomb units 11 were joined as shown in Table 3. The type of inorganic binder, unit cross section area, thickness of the seal layer, unit area ratio, seal layer area ratio and firing temperature of the honeycomb unit 11, of the honeycomb structure 10 of the examples 35 to 42 are shown in Table 3. In all the samples shown in Table 3, the inorganic particles are γ-alumina particles (average particle diameter: 2 μm), and the inorganic fibers are silica alumina fibers (average fiber diameter: 10 μm, average fiber length: 100 μm, aspect ratio: 10). The shapes of the honeycomb unit assemblies of the examples 35 to 36 are the same as those of FIG. 4(*a*), and the shapes of the honeycomb unit assemblies of the examples 37 to 38 are the same as those of FIG. 4(*c*).

fiber length: 100 μm, aspect ratio: 10), 15% by weight of the inorganic binder, and 35% by weight of water, added an organic binder, a plasticizer and a lubricant in the same manner as in the example 1, molded and fired to obtain the honeycomb units 11. Next, the multiple honeycomb units 11 were joined with the same sealing paste as that of the example 1, and the honeycomb unit assembly was cut in the same manner as in the example 1. The coating layer 16 was formed to obtain the cylindrical honeycomb structure 10 (143.8 mmφ in diameter×150 mm in height).

Example 42

The honeycomb structure 10 was produced in the same manner as in the example 1 except for mixing no inorganic binder as shown in Table 3. Specifically, the process of examples 42 mixed 50% by weight of γ-alumina particles

TABLE 3

| Sample[1] | Inorganic binder type | Unit cross section area cm² | Seal layer thickness mm | Unit area ratio % | Seal layer area ratio[2] % | Firing temperatur °C. |
|---|---|---|---|---|---|---|
| Example 35 | Silica sol | 11.8 | 2.0 | 89.3 | 10.7 | 800 |
| Example 36 | Silica sol | 11.8 | 3.0 | 84.8 | 15.2 | 800 |
| Example 37 | Silica sol | 5.0 | 2.0 | 83.5 | 16.5 | 800 |
| Example 38 | Silica sol | 5.0 | 1.5 | 86.8 | 13.2 | 800 |
| Example 39 | Alumina sol | 11.8 | 1.0 | 93.5 | 6.5 | 800 |
| Example 40 | Sepiolite | 11.8 | 1.0 | 93.5 | 6.5 | 800 |
| Example 41 | Attapulgite | 11.8 | 1.0 | 93.5 | 6.5 | 800 |
| Example 42 | — | 11.8 | 1.0 | 93.5 | 6.5 | 1000 |

[1]Inorganic particles = γ-alumina particles
Inorganic fibers = silica alumina fibers (diameter: 10 μm, length: 100 μm, aspect ratio: 10)
[2]The area of a coating layer is included.

Example 39

As shown in Table 3, the honeycomb structure 10 was produced in the same manner as in the example 1 except for using the alumina sol (solid content: 30% by weight) as the inorganic binder.

Examples 40 and 41

The honeycomb structures 10 were produced in the same manner as in the example 1 except for using sepiolite and attapulgite as the inorganic binder. Specifically, the processes of examples 40 and 41 mixed 40% by weight of γ-alumina particles (average particle diameter: 2 μm), 10% by weight of silica alumina fibers (average fiber diameter: 10 μm, average (average particle diameter: 2 μm), 15% by weight (average fiber diameter: 10 μm, average fiber length: 100 μm, aspect ratio: 10) of silica alumina fibers, and 35% by weight of water, added the organic binder, the plasticizer and the lubricant in the same manner as in the example 1, molded and fired the molded body at 1000° C. to obtain the honeycomb unit 11. Next, the multiple honeycomb units 11 were joined with the same sealing paste as that of the example 1, and the honeycomb unit assembly was cut in the same manner as in the example 1. The coating layer 16 was formed to obtain the cylindrical honeycomb structure 10 (143.8 mmφ in diameter× 150 mm in height). All the shapes of the honeycomb unit assemblies of the examples 39 to 42 are the same as those of FIG. 4(*a*).

Examples 43 to 49

The honeycomb structures 10 were produced in the same manner as in the example 1 except for changing the flatness and the unit level difference. The unit shape, unit cross section area, unit area ratio, seal layer area ratio, flatness and unit level difference of the honeycomb structure 10 are shown in Table 4. Table 4 also shows the specifications of the examples 1 to 3, 5 and 6. Table 4 shows the maximum of the level difference in the respective honeycomb structures 10 referring to the unit level difference. In all the samples shown in Table 4, the inorganic fibers are silica alumina fibers (average fiber diameter: 10 μm, average fiber length: 100 μm, aspect ratio: 10), and the inorganic binder is silica sol (solid content: 30% by weight). All the shapes of the honeycomb unit assemblies of the examples 43 to 49 are the same as those of FIG. 4(a).

TABLE 4

| Sample[1] | Unit shape cm | Unit Cross section cm² | Unit area ratio % | Seal layer area ratio[2] % | Flatness L mm | Unit level difference[3] mm |
|---|---|---|---|---|---|---|
| Example 1 | 3.43 cm square | 11.8 | 93.5 | 6.5 | 0.5 | 0.2 |
| Example 2 | 2.00 cm square | 4.0 | 89.7 | 10.3 | 0.5 | 0.2 |
| Example 3 | 2.24 cm square | 5.0 | 90.2 | 9.8 | 0.5 | 0.2 |
| Example 5 | 7.10 cm square | 50.0 | 95.5 | 4.5 | 0.5 | 0.5 |
| Example 6 | 7.41 cm square | 55.0 | 95.6 | 4.4 | 0.5 | 0.5 |
| Example 43 | 3.43 cm square | 11.8 | 93.5 | 6.5 | 1.5 | 0.5 |
| Example 44 | 3.43 cm square | 11.8 | 93.5 | 6.5 | 2.0 | 1.0 |
| Example 45 | 3.43 cm square | 11.8 | 93.5 | 6.5 | 2.5 | 1.0 |
| Example 46 | 3.43 cm square | 11.8 | 93.5 | 6.5 | 2.5 | 2.0 |
| Example 47 | 3.43 cm square | 11.8 | 93.5 | 6.5 | 2.5 | 2.5 |
| Example 48 | 3.43 cm square | 11.8 | 93.5 | 6.5 | 3.0 | 2.0 |
| Example 49 | 3.43 cm square | 11.8 | 93.5 | 6.5 | 3.0 | 2.5 |

[1] Inorganic particles = γ-alumina particles
Inorganic fibers = silica alumina fibers (diameter: 10 μm, length: 100 μm, Aspect Ratio: 10)
[2] The area of a coating layer is included
[3] Largest level difference of level differences between joined honeycomb units

[Measurement of Specific Surface Area]

The specific surface areas of the honeycomb units 11 of the examples 1 to 49 were measured. The measurement process first measured the volumes of the honeycomb unit 11 and seal layer, and calculated a ratio A (% by volume) of the volume of the component material of the unit to the volume of the honeycomb structure. The measurement process then measured a BET specific surface area B (m²/g) per unit weight of the honeycomb unit 11. The BET specific surface area was measured with a BET measurement apparatus (Micromeritics Flow Sorb II-2300 manufactured by Shimadzu Corporation) according to a BET one point method in conformity with Japanese Industrial Standards JIS-R-1626 (1996). The contents of JIS-R-1626 (1996) are incorporated by reference herein. Each cylindrical sample piece (15 mmϕ in diameter× 15 mm in height) was used for the measurement. The measurement process then computed an apparent density C (g/L) of the honeycomb unit 11 from the weight and apparent volume of the honeycomb unit 11 and calculated a specific surface area S (m²/L) per unit volume of the honeycomb structure according to Equation (1) given below. The specific surface area of the honeycomb structure represents the specific surface area per the apparent volume of the honeycomb structure.

$$S(m^2/L) = (A/100) \times B \times C; \quad \text{Equation (1)}$$

[Thermal Shock and Vibration Repeating Test]

Figure 6:
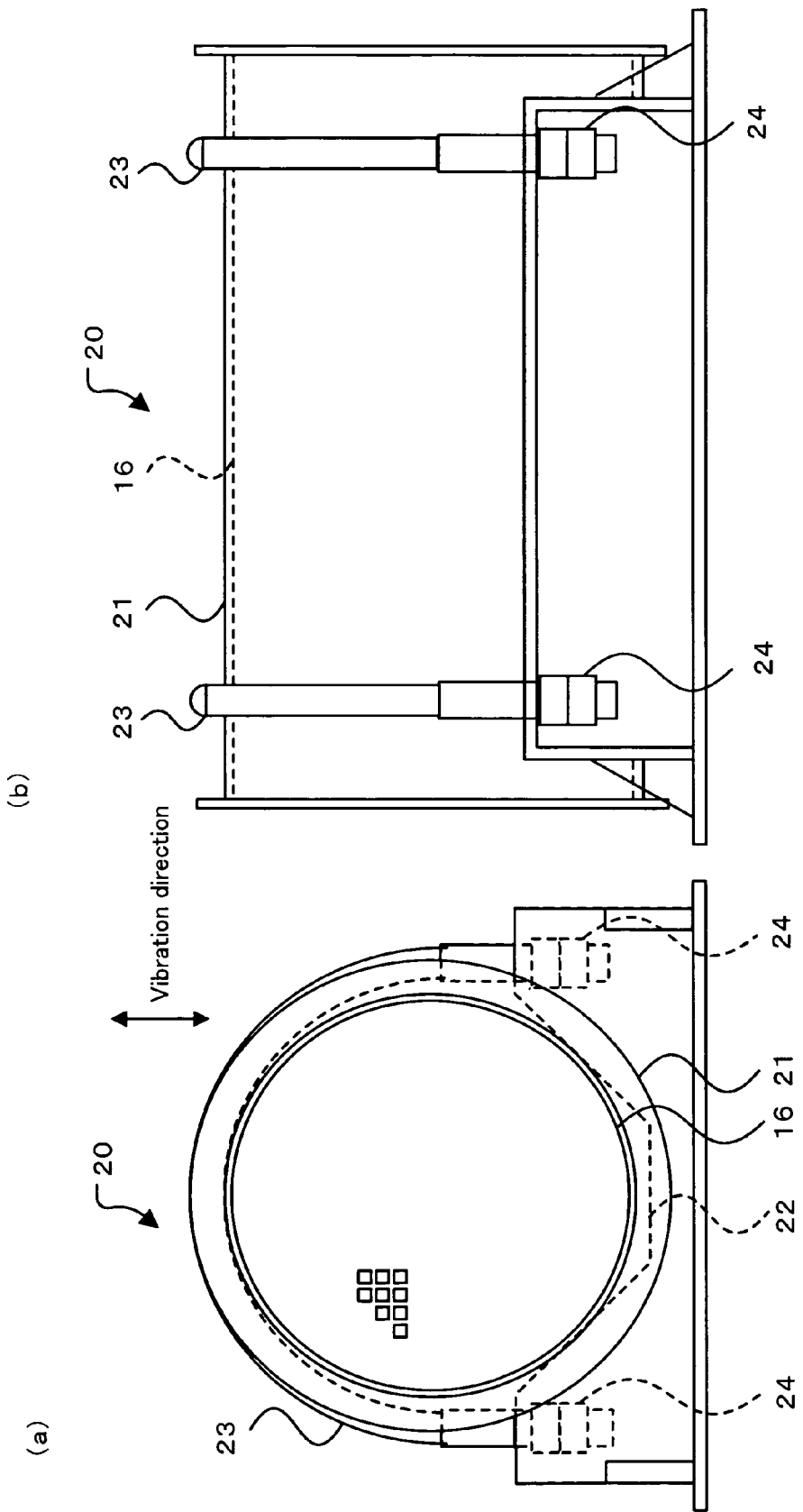
FIG. 6 schematically illustrates a vibrator apparatus 20.

The thermal shock and vibration repeating tests of the honeycomb structures of the examples 1 to 49 were performed. In the thermal shock test, a metal casing 21 was put into a firing furnace set to 600° C. in a state where an alumina mat (MAFTEC, manufactured by Mitsubishi Chemical, 46.5 cm×15 cm×6 mm in thickness) of a thermal insulation made of the alumina fiber was wound around the outer circumferential face of the honeycomb structure and was put into the metal casing 21, and was heated for 10 minutes. The metal casing 21 was taken out from the firing furnace, and rapidly cooled to room temperature. Next, the vibration test was performed, while the honeycomb structure was put into the metal casing. FIG. 6 schematically illustrates a vibrator apparatus 20 used for vibration test. FIG. 6(a) is an front view thereof and FIG. 6(b) is a side view thereof. The metal casing 21 in which the honeycomb structure was put was placed on a pedestal 22, and the metal casing 21 was fixed by fastening a fixing fixture 23 having nearly a U-shape by a screw 24. Then, the metal casing 21 could be vibrated in a state that the metal casing 21 is integrated with the pedestal 22 and the fixing fixture 23. The vibration test was performed under conditions of a frequency of 160 Hz, acceleration of 30 G, amplitude of 0.58 mm, retention time of 10 hours, room temperature and vibrating direction of the Z axial direction (up and down). The thermal shock test and vibration test were alternately and respectively repeated 10 times. The weight T0 of the honeycomb structure before the test and the weight Ti after the test were measured, and the rate G of weight reduction was calculated using the following Equation (2).

$$G(\% \text{ by weight}) = 100 \times (T0 - Ti)/T0; \quad \text{Equation (2)}$$

[Pressure Loss Measurement]

Figure 7:
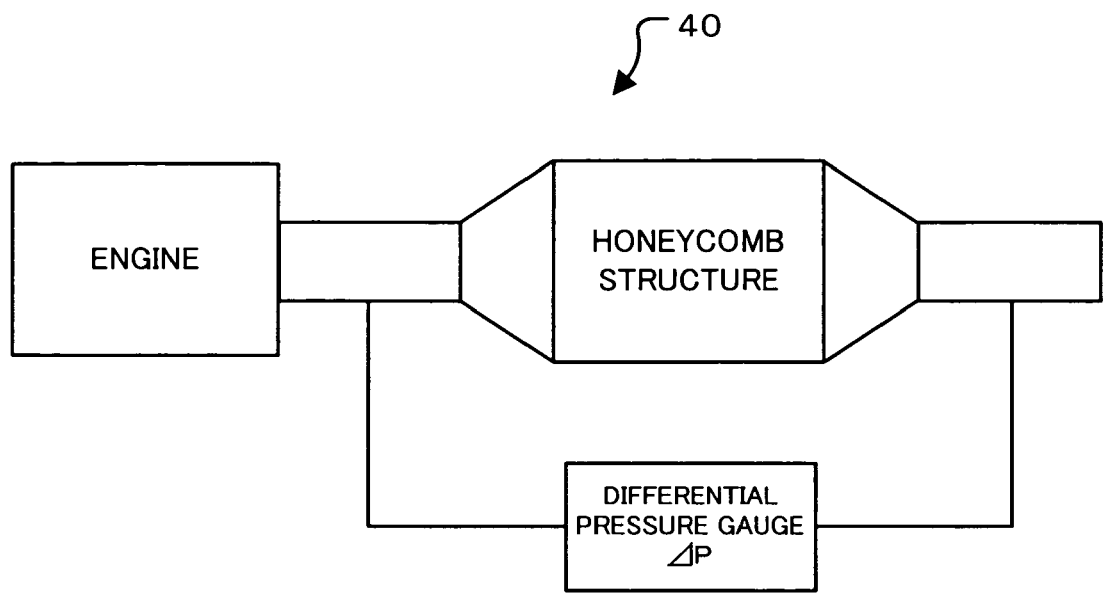
FIG. 7 schematically illustrates a pressure loss measurement apparatus 40.

The pressure loss measurements of the honeycomb structures of the examples 1 to 49 were performed. A pressure loss measurement apparatus 40 is shown in FIG. 7. Referring to the measuring method, a honeycomb structure in which an alumina mat was wound around an exhaust pipe of a common rail type diesel engine of 2 L was put into a metal casing, and a pressure gauge was attached before and after the honeycomb structure. Referring to the measurement conditions, the number of rotations of an engine was set to 1500 rpm, and the torque was set to 50 Nm. The differential pressure after 5 minutes from start of operation was measured.

[Measurement of Flatness and Unit Level Difference]

Figure 8:
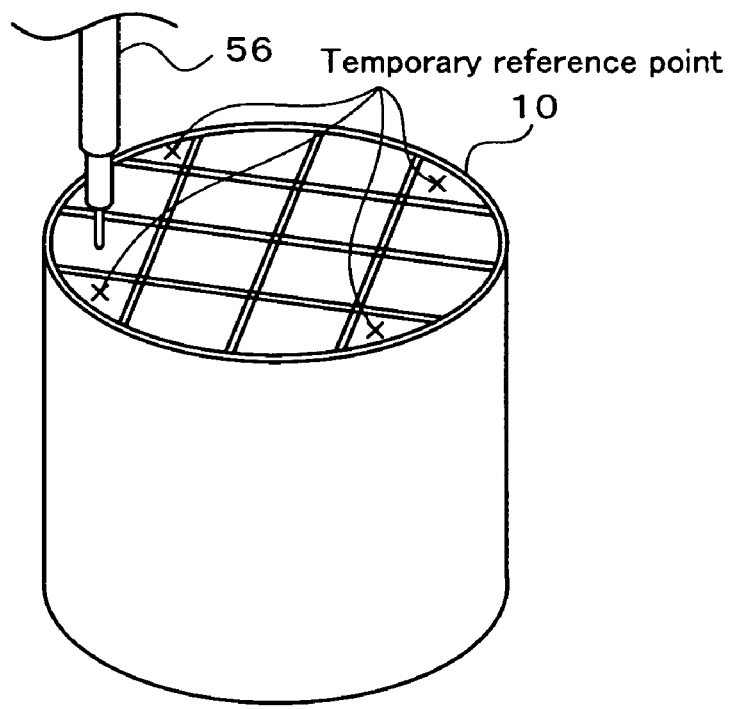
FIG. 8 schematically illustrates the measurement of flatness.
Figure 8:
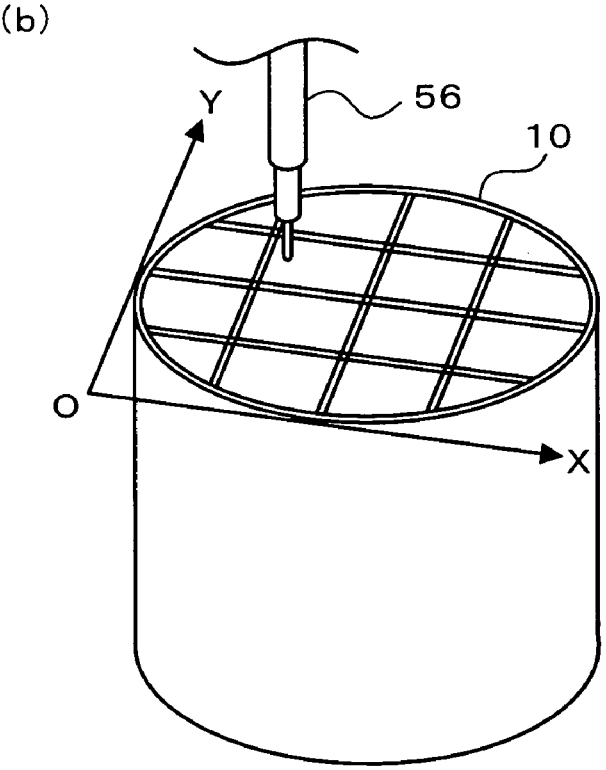

The flatness and unit level difference of the examples 1 to 3, 5, 6, and 43 to 49 were measured. The flatness is measured by referring to JIS-B0621 (1984), by using a three-dimensional measuring apparatus (FALCIO916) manufactured by Mitsutoyo Corporation, and by using TP2 as a probe 56. The contents of JIS-B0621 (1984) are incorporated by reference herein. FIG. 8 schematically illustrates the measurement of flatness. FIG. 8(*a*) shows the setup of temporary reference points, and FIG. 8(*b*) shows the setup of XY axes. The measuring method is specifically explained. First, a four-point plane measurement was performed by using the probe 56 on the end face of the honeycomb structure 10 after fixing the honeycomb structure 10, and the temporary reference points were set (FIG. 8(*a*)). An origin O of XY axes of the end face was set (FIG. 8(*b*)). Measurements were performed at arbitrary points by scanning the probe 56 in the X-axial direction and the Y-axial direction from the origin O, and the flatness was calculated from the difference between the values of the highest point and lowest point in the end face measured. The unit level difference was also calculated by analyzing the honeycomb unit 11 of the honeycomb structure 10 in which the measured point exists.

[Measurement of Rate of Weight Reduction after Gas Circulation]

A measurement test for the rate of weight reduction after gas circulation of the honeycomb structures of the examples 1 to 3, 5, 6, and 43 to 49 was performed. The test measures the weight change of the honeycomb structure 10 after circulating exhaust gas for a predetermined time using a pressure loss measurement apparatus 40 shown in FIG. 7. Referring to the measuring method, the honeycomb structure in which an alumina mat was wound around an exhaust pipe of a common rail type diesel engine of 2 L was fixed to the metal casing and provided so that the end face of which the flatness was measured is located at the upstream of the exhaust gas. Referring to the measurement conditions, the number of rotations of the engine was set to 3000 rpm, and the torque was set to 50 Nm. The engine was continuously operated on the measurement conditions for 120 hours. The honeycomb structure 10 was then taken out from the metal casing, and the weight W0 of the honeycomb structure before the test and the weight Wi after the test were measured. The rate F of weight reduction was calculated by using the following Equation (3).

$$F(\% \text{ by weight}) = 100 \times (W0 - Wi)/W0;$$ Equation (3)

[Experimental Results]

Figure 9:
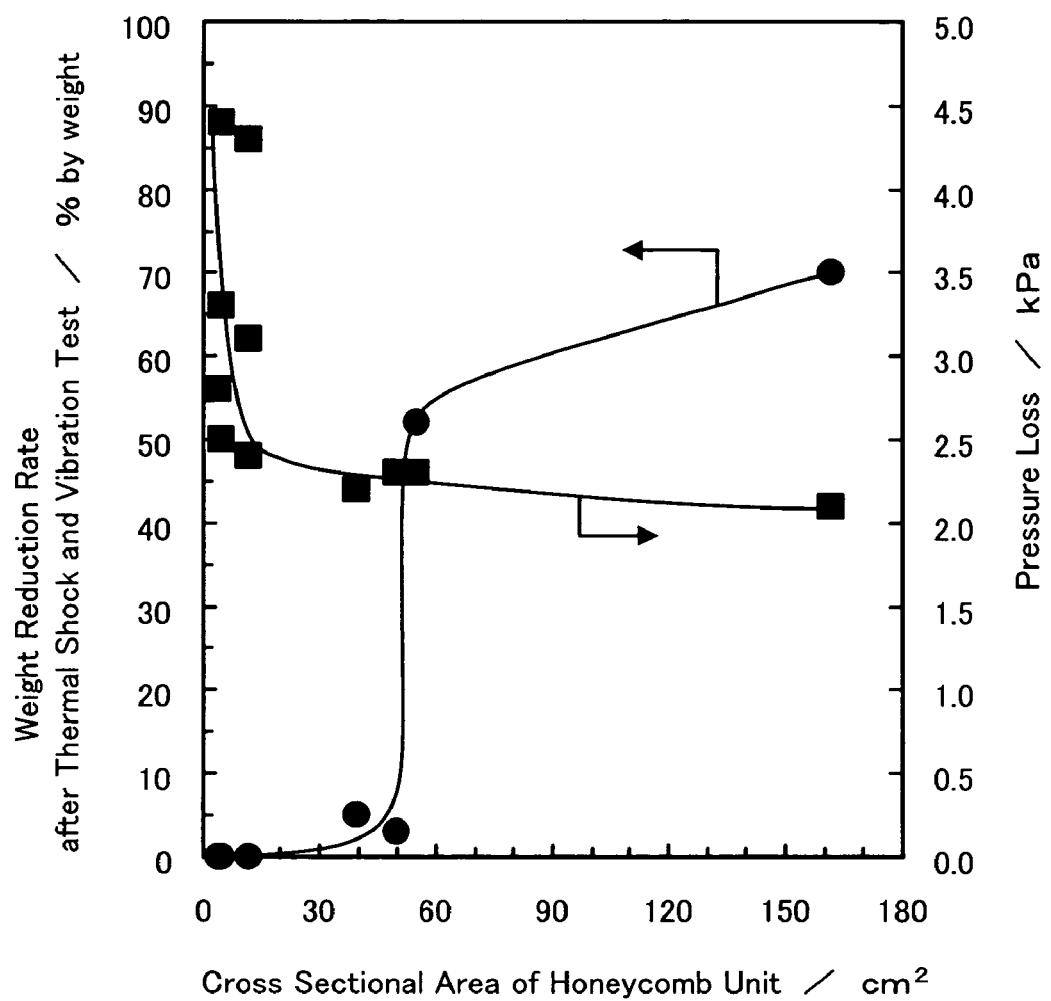
FIG. 9 shows the relationship among the cross section area, rate of weight reduction and pressure loss of the honeycomb unit.
Figure 10:
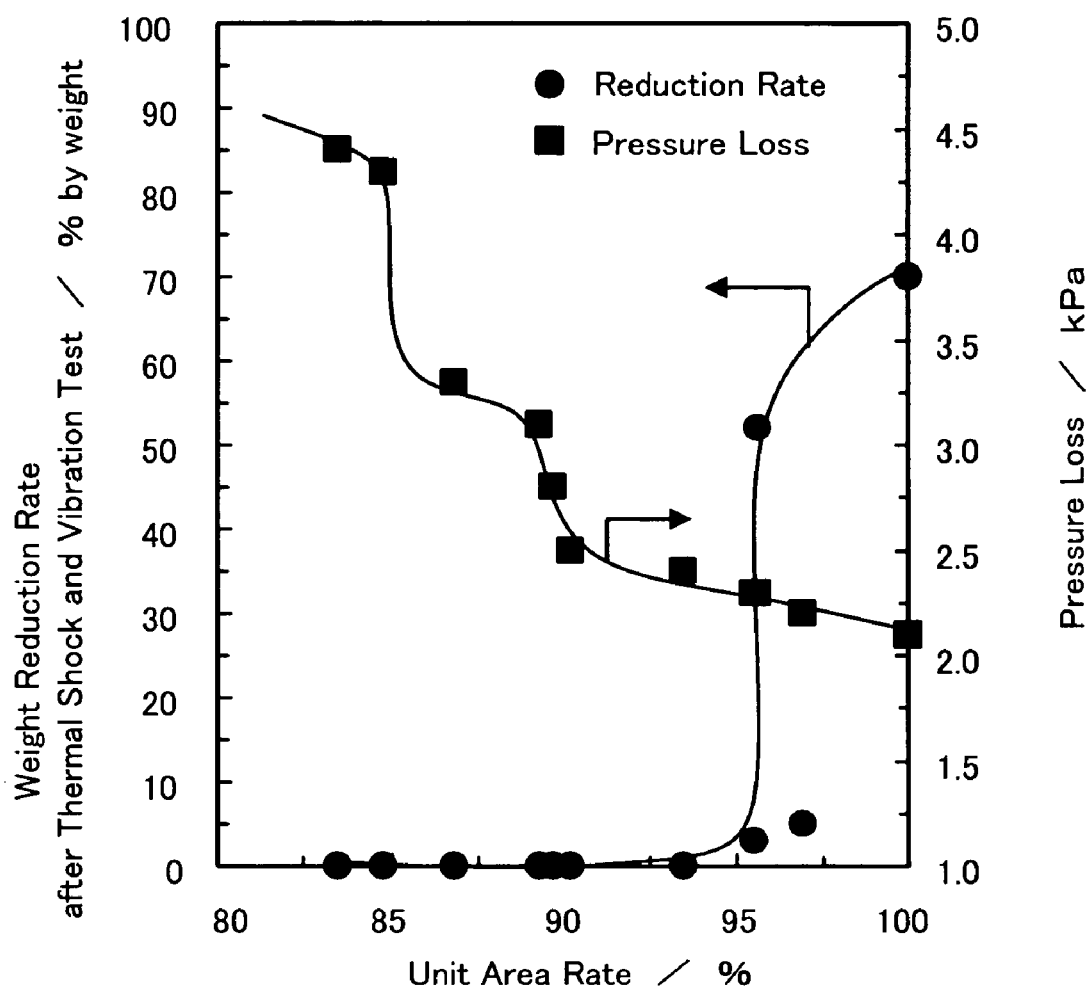
FIG. 10 shows the relationship among unit area ratio, rate of weight reduction and pressure loss.

The inorganic particle components, unit cross section area, unit area ratio and specific surface area of the honeycomb unit, specific surface area S of the honeycomb structure, rate G of weight reduction of the thermal shock and vibration repeating test, and pressure loss of the examples 1 to 29 and examples 35 to 38 are shown in Table 5. FIG. 9 shows the plots of the cross section area of the honeycomb unit as the abscissa and the rate G of weight reduction of the thermal shock and vibration repeating test and the pressure loss as the ordinate. FIG. 10 shows the plots of the unit area ratio as the abscissa and the rate G of weight reduction of the thermal shock and vibration repeating test and the pressure loss as the ordinate. The measurement results of the examples 1 to 29 and examples 35 to 38 shown in Table 5 and FIG. 9 showed clearly that the specific surface area per unit volume of the honeycomb structure was increased by using the inorganic particles, the inorganic fibers and the inorganic binder as the main components, and by setting the cross section area of the honeycomb unit 11 to in range of about 5 to about 50 cm$^2$, and sufficient strength to thermal shocks and vibrations was easily obtained. FIG. 10 showed that the specific surface area per unit volume of the honeycomb structure could be increased to the specific surface area of the honeycomb unit by using the inorganic particles, the inorganic fibers and the inorganic binder as the main components, by setting the cross section area of the honeycomb unit 11 to about 50 cm$^2$ or less, and by setting the unit area ratio to about 85% or more, sufficient strength to thermal shocks and vibrations was easily obtained, and the low pressure loss was shown. Particularly, the pressure loss was remarkably reduced in the unit area ratio of about 90% or more.

TABLE 5

| Sample* | Inorganic particles | Unit Cross Section Area cm$^2$ | Unit area ratio % | Unit specific surface area m$^2$/L | Structure specific surface area S m$^2$/L | Reduction rate G of thermal shock and vibration test % by Weight | Pressure loss kPa |
|---|---|---|---|---|---|---|---|
| Example 1 | Alumina | 11.8 | 93.5 | 42000 | 39270 | 0 | 2.4 |
| Example 2 | Alumina | 4.0 | 89.7 | 42000 | 37674 | 0 | 2.8 |
| Example 3 | Alumina | 5.0 | 90.2 | 42000 | 37884 | 0 | 2.5 |
| Example 4 | Alumina | 39.5 | 96.9 | 42000 | 40698 | 5 | 2.2 |
| Example 5 | Alumina | 50.0 | 95.5 | 42000 | 40110 | 3 | 2.3 |
| Example 6 | Alumina | 55.0 | 95.6 | 42000 | 40152 | 52 | 2.3 |
| Example 7 | Alumina | 162.0 | 100.0 | 42000 | 42000 | 70 | 2.1 |
| Example 8 | Titania | 11.8 | 93.5 | 38000 | 35530 | 0 | 2.4 |
| Example 9 | Titania | 4.0 | 89.7 | 38000 | 34086 | 0 | 2.8 |
| Example 10 | Titania | 5.0 | 90.2 | 38000 | 34276 | 0 | 2.5 |
| Example 11 | Titania | 39.5 | 96.9 | 38000 | 36822 | 7 | 2.2 |
| Example 12 | Titania | 50.0 | 95.5 | 38000 | 36290 | 5 | 2.3 |
| Example 13 | Titania | 55.0 | 95.6 | 38000 | 36328 | 63 | 2.3 |
| Example 14 | Titania | 162.0 | 100.0 | 38000 | 38000 | 90 | 2.1 |
| Example 15 | Silica | 11.8 | 93.5 | 41000 | 38335 | 0 | 2.4 |
| Example 16 | Silica | 4.0 | 89.7 | 41000 | 36777 | 0 | 2.8 |
| Example 17 | Silica | 5.0 | 90.2 | 41000 | 36982 | 0 | 2.5 |
| Example 18 | Silica | 39.5 | 96.9 | 41000 | 39729 | 4 | 2.2 |
| Example 19 | Silica | 50.0 | 95.5 | 41000 | 39155 | 3 | 2.3 |
| Example 20 | Silica | 55.0 | 95.6 | 41000 | 39196 | 42 | 2.3 |
| Example 21 | Silica | 162.0 | 100.0 | 41000 | 41000 | 65 | 2.1 |
| Example 22 | Zirconia | 11.8 | 93.5 | 41500 | 38803 | 0 | 2.4 |

TABLE 5-continued

| Sample* | Inorganic particles | Unit Cross Section Area cm² | Unit area ratio % | Unit specific surface area m²/L | Structure specific surface area S m²/L | Reduction rate G of thermal shock and vibration test % by Weight | Pressure loss kPa |
|---|---|---|---|---|---|---|---|
| Example 23 | Zirconia | 4.0 | 89.7 | 41500 | 37226 | 0 | 2.8 |
| Example 24 | Zirconia | 5.0 | 90.2 | 41500 | 37433 | 0 | 2.5 |
| Example 25 | Zirconia | 39.5 | 96.9 | 41500 | 40214 | 5 | 2.2 |
| Example 26 | Zirconia | 50.0 | 95.5 | 41500 | 39633 | 3 | 2.3 |
| Example 27 | Zirconia | 55.0 | 95.6 | 41500 | 39674 | 57 | 2.3 |
| Example 28 | Zirconia | 162.0 | 100.0 | 41500 | 41500 | 83 | 2.1 |
| Example 29 | Cordierite + alumina | 162.0 | 100.0 | 25000 | 25000 | 0 | 2.9 |
| Example 35 | Alumina | 11.8 | 89.3 | 42000 | 37506 | 0 | 3.1 |
| Example 36 | Alumina | 11.8 | 84.8 | 42000 | 35616 | 0 | 4.3 |
| Example 37 | Alumina | 5.0 | 83.5 | 42000 | 35070 | 0 | 4.4 |
| Example 38 | Alumina | 5.0 | 86.8 | 42000 | 36456 | 0 | 3.3 |

*Inorganic fibers = silica alumina fibers (diameter: 10 μm, length: 100 μm, aspect ratio: 10)

Figure 11:
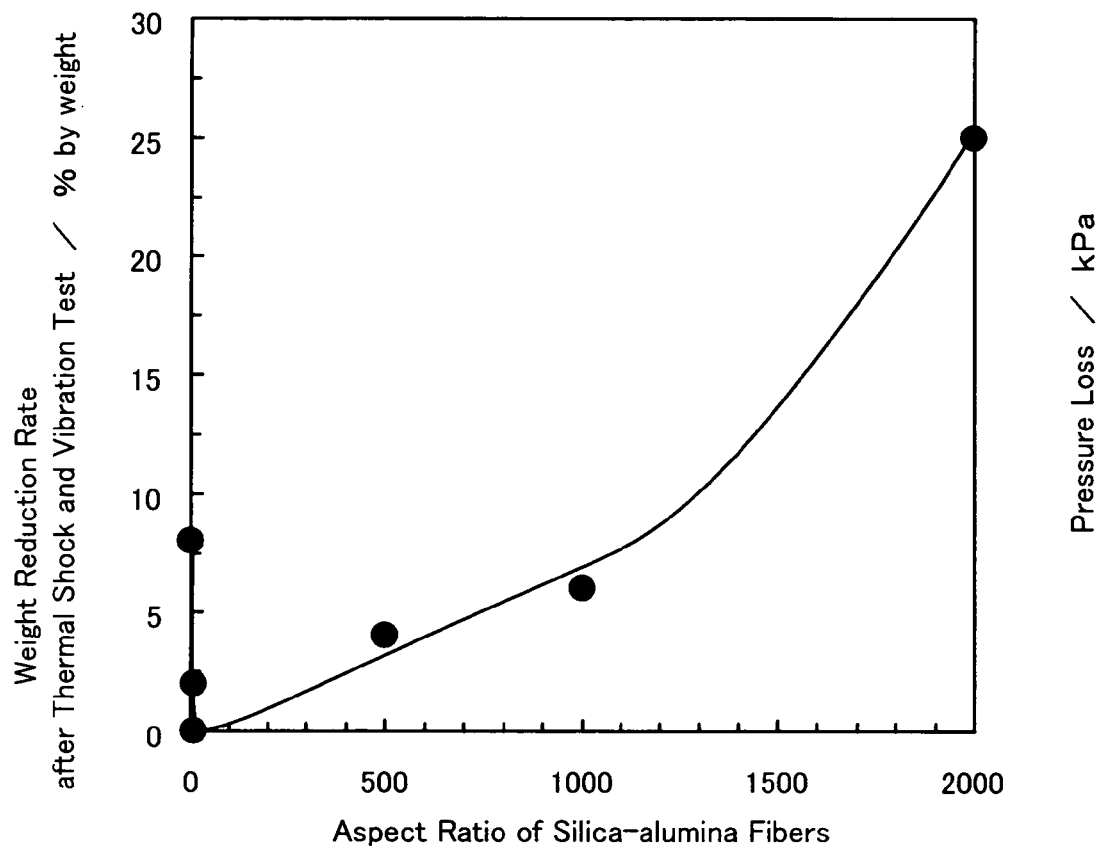
FIG. 11 shows the relationship between the aspect ratio of silica alumina fibers and rate of weight reduction.

Then, in the example 1, 30 to 34 in which the aspect ratio of the inorganic fibers was changed, the diameter, length and aspect ratio of the silica alumina fibers, and the specific surface area of the honeycomb unit 11, the specific surface area S of the honeycomb structure 10, the rate G of weight reduction of the thermal shock and vibration repeating test, and the pressure loss are shown in Table 6. FIG. 11 shows the plots of the aspect ratio of silica alumina fibers as the abscissa and the rate G of weight reduction of the thermal shock and vibration repeating test as the ordinate. The results showed that sufficient strength to thermal shocks and vibrations was obtained when the aspect ratio of inorganic fibers was within the range of 2 to 1000.

TABLE 6

| | Silica alumina fibers | | | Unit specific | Structure specific | Reduction rate G of thermal shock and | Pressure |
| Sample* | Diameter μm | Length μm | Aspect ratio | surface area m²/L | surface area S m²/L | vibration test % by Weight | loss kPa |
|---|---|---|---|---|---|---|---|
| Example 1 | 10 | 100 | 10 | 42000 | 39270 | 0 | 2.4 |
| Example 30 | 5 | 50 | 10 | 42000 | 39270 | 2 | 2.4 |
| Example 31 | 10 | 20 | 2 | 42000 | 39270 | 8 | 2.4 |
| Example 32 | 10 | 5000 | 500 | 42000 | 39270 | 4 | 2.4 |
| Example 33 | 10 | 10000 | 1000 | 42000 | 39270 | 6 | 2.4 |
| Example 34 | 10 | 20000 | 2000 | 42000 | 39270 | 25 | 2.4 |

*Inorganic particles = γ-alumina particles

Then, in examples 39 to 41 in which the honeycomb unit 11 is produced by changing the type of inorganic binder, and the example 42 produced without mixing the inorganic binder, the type of inorganic binder, firing temperature of the honeycomb unit 11, unit area ratio, specific surface area of the honeycomb unit, specific surface area S of the honeycomb structure, rate G of weight reduction of the thermal shock and vibration repeating test, and pressure loss are shown in Table 7. The results showed that sufficient strength was easily obtained by firing at comparatively high temperature when the inorganic binder was not mixed. The results showed that sufficient strength was easily obtained even if the honeycomb structure was fired at comparatively low temperature when the inorganic binder was mixed. The results showed that even if the alumina sol and the clay binder were used as the inorganic binder, specific surface area per unit volume of the honeycomb structure 10 could be increased, and sufficient strength to thermal shocks and vibrations was easily obtained.

TABLE 7

| Sample* | Inorganic binder Type | Unit area ratio % | Firing temperature °C. | Unit specific surface area m²/L | Structure specific surface area S m²/L | Reduction rate G of thermal shock and vibration test % by Weight | Pressure loss kPa |
|---|---|---|---|---|---|---|---|
| Example 39 | Alumina sol | 93.5 | 800 | 42000 | 39270 | 0 | 2.4 |
| Example 40 | Sepiolite | 93.5 | 800 | 42000 | 39270 | 0 | 2.4 |

TABLE 7-continued

| Sample* | Inorganic binder Type | Unit area ratio % | Firing temperature ° C. | Unit specific surface area m²/L | Structure specific surface area S m²/L | Reduction rate G of thermal shock and vibration test % by Weight | Pressure loss kPa |
|---|---|---|---|---|---|---|---|
| Example 41 | Attapulgite | 93.5 | 800 | 42000 | 39270 | 0 | 2.4 |
| Example 42 | — | 93.5 | 1000 | 40000 | 37400 | 20 | 2.4 |

Figure 12:
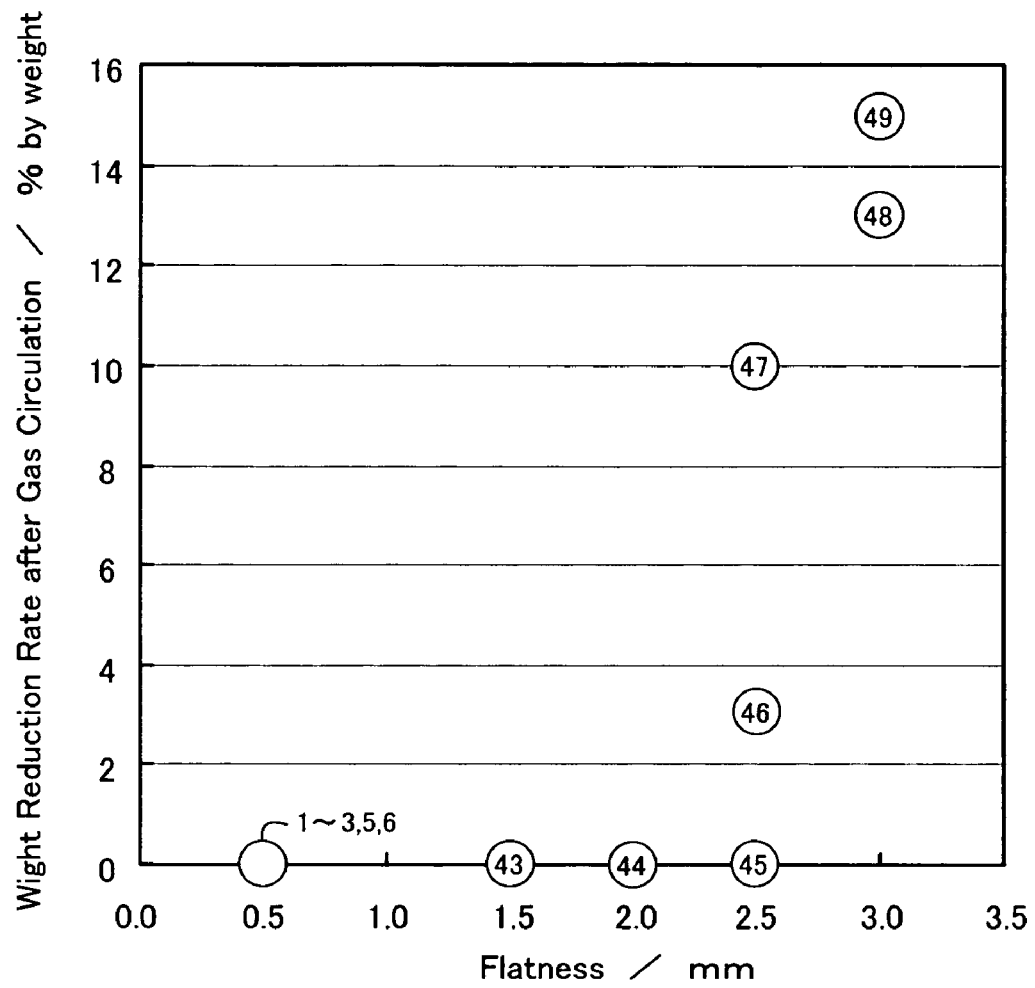
FIG. 12 shows the relationship between the flatness and the rate of weight reduction after gas circulation.
Figure 13:
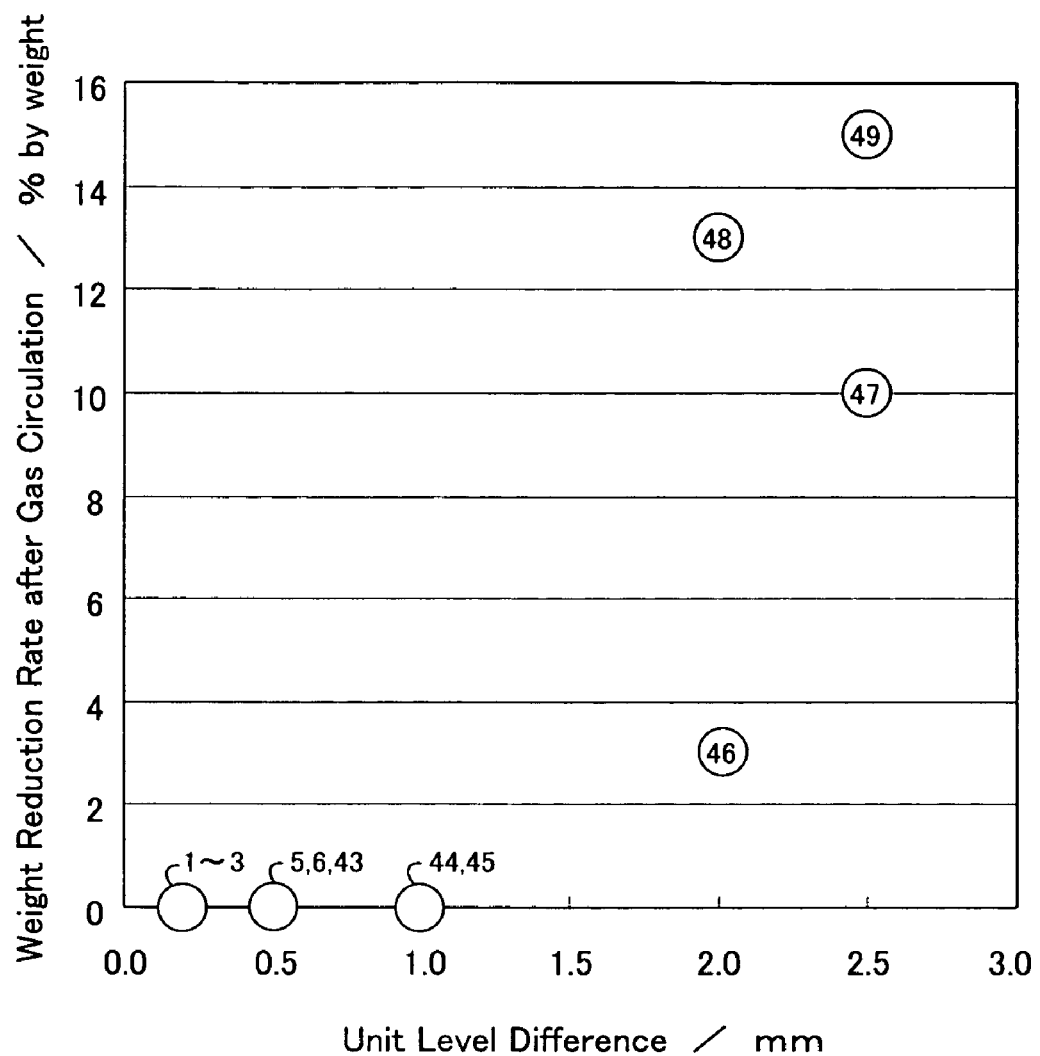
FIG. 13 shows the relationship between the unit level difference and the rate of weight reduction after gas circulation.

*Inorganic particles = γ-alumina particles
Inorganic fibers = silica alumina fibers (diameter: 10 μm, length: 100 μm, aspect ratio: 10)
Unit shape = 3.43 cm square Next, referring to the examples 43 to 49 and examples 1 to 3, 5 and 6 produced by changing the flatness and unit level difference of the honeycomb structure 10, the unit area ratio, flatness, unit level difference, specific surface area S per unit volume of the honeycomb structure, rate G of weight reduction of the thermal shock and vibration repeating test, pressure loss and rate F of weight reduction after gas circulation are shown in Table 8. FIG. 12 shows the plots of the flatness as the abscissa and the rate F of weight reduction after gas circulation as the ordinate. FIG. 13 shows the plots of the unit level difference as the abscissa and the rate F of weight reduction after gas circulation as the ordinate. The numbers of the examples are expressed in FIGS. 12 and 13. The results showed that the rate of weight reduction after the gas circulation was increased in the example 47 in which the flatness is 2.5 mm and in which the unit level difference is 2.5 mm and in the example 48 whose unit level difference is 2.0 mm but the flatness is 3.0 nm. That is, the examples 1 to 3, and 5, and examples 43 to 46 in which the unit cross section area was about 50 cm² or less, the flatness was about 2.5 mm or less, and the unit level difference was about 2.0 mm or less showed that sufficient strength to thermal shocks and vibrations and sufficient strength to gas circulation were easily obtained.

TABLE 8

| Sample[1] | Unit area ratio % | Flatness L mm | Unit level difference[2] mm | Structure specific surface area S m²/L | Reduction rate G % by Weight | Pressure loss kPa | Weight reduction rate after gas circulation % by Weight |
|---|---|---|---|---|---|---|---|
| Example 1 | 93.5 | 0.5 | 0.2 | 39270 | 0 | 2.4 | 0 |
| Example 2 | 89.7 | 0.5 | 0.2 | 37674 | 0 | 2.8 | 0 |
| Example 3 | 90.2 | 0.5 | 0.2 | 37884 | 0 | 2.5 | 0 |
| Example 5 | 96.9 | 0.5 | 0.5 | 40110 | 3 | 2.3 | 0 |
| Example 6 | 95.5 | 0.5 | 0.5 | 40152 | 52 | 2.3 | 0 |
| Example | 93.5 | 1.5 | 0.5 | 39270 | 0 | 2.4 | 0 |
| Example | 93.5 | 2.0 | 1.0 | 39270 | 0 | 2.4 | 0 |
| Example | 93.5 | 2.5 | 1.0 | 39270 | 0 | 2.4 | 0 |
| Example | 93.5 | 2.5 | 2.0 | 39270 | 5 | 2.6 | 3 |
| Example | 93.5 | 2.5 | 2.5 | 39270 | 5 | 2.5 | 10 |
| Example | 93.5 | 3.0 | 2.0 | 39270 | 5 | 2.6 | 13 |
| Example | 93.5 | 3.0 | 2.5 | 39270 | 7 | 2.6 | 15 |

[1]Inorganic particles = γ-alumina particles
Inorganic fibers = silica alumina fibers (diameter: 10 μm, length: 100 μm, aspect ratio: 10) Specific surface area of unit = 42000 m2/L
[2]Largest level difference of level differences between joined honeycomb units

[Honeycomb Catalyst]

The honeycomb structures 10 of examples 1 to 46 were soaked in a platinum nitrate solution to carry platinum as the catalyst component at a weight of 2 g/L per unit volume of the honeycomb structure 10 and was kept at 600° C. for 1 hour.

The present application claims the benefit of the priority from the International Application No. PCT/JP2005/012265 filed on Jun. 27, 2005, the entire contents of which are incorporated by reference herein.

What is claimed is:

1. A honeycomb structure, comprising:
    multiple honeycomb units having multiple through holes, all of the through holes being open on an end face of the honeycomb unit except the through holes in outer faces of the honeycomb units; and
    a seal layer that joins honeycomb units with each other via the respective closed outer faces of the honeycomb units where the through holes are not open,
    wherein the honeycomb unit includes at least inorganic particles, inorganic fibers and/or whiskers, and the inorganic fibers and/or whiskers increase a specific surface area of an inner wall of the multiple through holes;
    a cross section area of a honeycombed face of the honeycomb unit perpendicular to the through holes is about 5 to about 50 cm²;
    the flatness of an entire end face of the honeycomb units joined by the seal layer where the through holes are open is about 2.5 mm or less;
    the level difference between end faces of the honeycomb units joined by the seal layer is about 2.0 mm or less; and
    the specific surface area of about 35000 to about 70000 cm²/L.

2. The honeycomb structure according to claim 1, wherein a ratio of the total sum of the cross section areas of the honeycombed faces of the honeycomb units perpendicular to the through holes to a cross section area of a honeycombed face of the honeycomb structure perpendicular to the through holes is about 85% or more.

3. The honeycomb structure according to claim 1, wherein a ratio of the total sum of the cross section areas of the honeycombed faces of the honeycomb units perpendicular to the through holes to a cross section area of a honeycombed face of the honeycomb structure perpendicular to the through holes is about 90% or more.

4. The honeycomb structure according to claim 1, wherein the flatness of the entire end face of the honeycomb units joined by the seal layer is about 2.0 mm or less.

5. The honeycomb structure according to claim 1, wherein the level difference between end faces of the honeycomb units joined by the seal layer is about 1.0 mm or less.

6. The honeycomb structure according to claim 1, wherein the inorganic particles include at least one type selected from the group consisting of alumina, silica, zirconia, titania, ceria, mullite, and zeolite.

7. The honeycomb structure according to claim 1, wherein the inorganic fibers and whiskers include at least one type selected from the group consisting of alumina, silica, silicon carbide, silica alumina, glass, potassium titanate, and aluminum borate.

8. A honeycomb structure, comprising:
multiple honeycomb units having multiple through holes, all of the through holes being open on an end face of the honeycomb unit except the through holes in outer faces of the honeycomb units; and
a seal layer that joins honeycomb units with each other via respective closed outer faces of the honeycomb units where the through holes are not open,
wherein the honeycomb unit includes at least inorganic particles, inorganic fibers and/or whiskers, and the inorganic fibers and/or whiskers increase a specific surface area of an inner wall of the multiple through holes;
a cross section area of a honeycombed face of the honeycomb unit perpendicular to the through holes is about 5 to about 50 $cm^2$;
the flatness of an entire end face of the honeycomb units joined by the seal layer where the through holes are open is about 2.5 mm or less;
the level difference between end faces of the honeycomb units joined by the seal layer is about 2.0 mm or less,
wherein the honeycomb unit further includes an inorganic binder, and the inorganic binder includes at least one type selected from the group consisting of alumina sol, silica sol, titania sol, water glass, sepiolite, and attapulgite.

9. The honeycomb structure according to claim 1, wherein a catalyst component is carried on the honeycomb structure.

10. The honeycomb structure according to claim 9, wherein the catalyst component includes at least one type selected among noble metals, alkali metals, alkaline earth metal, and oxides.

11. The honeycomb structure according to claim 1, being used for a catalytic converter for converting the exhaust gas of vehicles.

12. The honeycomb structure according to claim 1, wherein the inorganic particles are chosen from alumina particles, silica particles, zirconia particles, titania particles, ceria particles, mullite particles, and zeolite particles, and said honeycomb unit is produced by firing materials including said inorganic fibers and/or whiskers and said inorganic particles at a temperature ranging from 600° C. and 1200° C.

13. The honeycomb structure according to claim 1, wherein a weight content of the inorganic fibers and/or whiskers in the honeycomb structure is from 3% to 70%.

* * * * *